United States Patent [19]
Beun et al.

[11] 3,735,349
[45] May 22, 1973

[54] METHOD OF AND DEVICE FOR PREPARING CHARACTERS FOR RECOGNITION

[75] Inventors: Matthijs Beun; Pieter Reijnierse, both of Emmasingel, Eindhoven, Netherlands

[73] Assignee: U.S. Philips Corporation, New York, N.Y.

[22] Filed: Nov. 9, 1971

[21] Appl. No.: 196,950

[30] Foreign Application Priority Data

Nov. 12, 1970 Netherlands ........................7016539

[52] U.S. Cl. ..........................................340/146.3 H
[51] Int. Cl. ..............................................G06k 9/00
[58] Field of Search..............340/146.3 H, 146.3 MA

[56] References Cited

UNITED STATES PATENTS 3,339,179 8/1967 Shelton et al.................340/146.3 H
3,196,398 7/1965 Baskin..........................340/146.3 H
3,541,511 11/1970 Hiroshi Genchi et al......340/146.3 H

*Primary Examiner*—Thomas A. Robinson
*Assistant Examiner*—Joseph M. Thesz, Jr.
*Attorney*—Frank R. Trifari

[57] ABSTRACT

A method and device for character rocognition. A character is imaged on a matrix. Skeletonizing is effected in that first character positions are marked, an indispensability criterion being used to determine whether a marked character position may be removed. Various indispensability criteria are possible. Skeletonizing is effected in cycles, while in a final cycle, all character positions are tested against an indispensability criterion. Subsequently, significant points are marked to facilitate recognition. Significant points are, inter alia, end points and junctions of series of character positions. The same method is used for matrices of different construction. Finally, series of character positions which are too short, and which start from a junction, are removed. The length can be defined as the number of character positions in a series, or as the number of character psotions of the shortest possible series connecting the end points of a series to the first junction of that series. The procedure may start from a junction as well as from an end point.

11 Claims, 28 Drawing Figures

INVENTORS
MATTHIJS BEUN
PIETER REIJNIERSE
BY
[signature]
AGENT

INVENTORS
MATTHIJS BEUN
PIETER REIJNIERSE
BY
AGENT

INVENTORS
MATTHIJS BEUN
PIETER REIJNIERSE
BY
[signature]
AGENT

INVENTORS
MATTHIJS BEUN
PIETER REIJNIERSE
BY
AGENT

INVENTORS
MATTHIJS BEUN
PIETER REIJNIERSE
BY
AGENT

INVENTORS
MATTHIJS BEUN
PIETER REIJNIERSE

BY [signature]

AGENT

INVENTORS
MATTHIJS BEUN
PIETER REIJNIERSE

BY [signature]
AGENT

PATENTED MAY 22 1973 3,735,349

SHEET 08 OF 14

INVENTORS
MATTHIJS BEUN
PIETER REIJNIERSE

BY [signature]
AGENT

INVENTORS
MATTHIJS BEUN
PIETER REIJNIERSE
BY
AGENT

INVENTORS
MATTHIJS BEUN
PIETER REIJNIERSE

BY

AGENT

INVENTORS
MATTHIJS BEUN
PIETER REIJNIERSE

BY [signature]

AGENT

| | RT | RA | | | PT | PA | | | |
|---|---|---|---|---|---|---|---|---|---|
| 1 | 1 | 0 | 0 | 1 | – | 0 | 0 | 0 | |
| 2 | 0 | 0 | 0 | 1 | 1 | 0 | 0 | 1 | |
| 3 | 0 | 0 | 0 | 1 | 0 | 0 | 0 | 1 | |
| 4 | 1 | 0 | 0 | 1 | 0 | 0 | 0 | 1 | $C_1$ |
| 5 | 1 | 0 | 0 | 1 | – | 0 | 0 | 0 | |
| 6 | – | 0 | 0 | 0 | 1 | 0 | 1 | 0 | |
| 7 | 1 | 0 | 1 | 0 | – | 0 | 0 | 0 | |
| 8 | – | 0 | 0 | 0 | 0 | 0 | 1 | 0 | |
| 9 | 1 | 0 | 1 | 1 | 1 | 0 | 0 | 1 | |
| 10 | 0 | 0 | 1 | 0 | 1 | 0 | 1 | 0 | |
| 11 | 0 | 0 | 1 | 0 | 0 | 0 | 1 | 0 | |
| 12 | 1 | 0 | 1 | 0 | 0 | 0 | 1 | 0 | |
| 13 | 1 | 0 | 0 | 1 | – | 0 | 0 | 0 | |
| 14 | 1 | 0 | 0 | 1 | 1 | 0 | 0 | 1 | |
| 15 | – | 0 | 0 | 0 | 1 | 0 | 1 | 0 | |
| 16 | 0 | 0 | 0 | 1 | 1 | 0 | 0 | 1 | $C_2$ |
| 17 | 0 | 0 | 1 | 0 | – | 0 | 0 | 0 | |
| 18 | 0 | 0 | 0 | 1 | 0 | 0 | 0 | 1 | |
| 19 | – | 0 | 0 | 0 | 0 | 0 | 1 | 0 | |
| 20 | 1 | 0 | 0 | 1 | 0 | 0 | 0 | 1 | |
| 21 | 1 | 0 | 1 | 1 | – | 0 | 0 | 0 | |
| 22 | – | 0 | 0 | 0 | 1 | 1 | 0 | 0 | |
| 23 | 0 | 1 | 0 | 0 | – | 0 | 0 | 0 | |
| 24 | – | 0 | 0 | 0 | 0 | 1 | 0 | 0 | |
| 25 | 1 | 0 | 1 | 0 | 0 | 0 | 0 | 1 | |
| 26 | 1 | 0 | 1 | 1 | 1 | 0 | 1 | 1 | |
| 27 | 0 | 0 | 1 | 1 | 1 | 0 | 1 | 1 | |
| 28 | 0 | 0 | 1 | 1 | 0 | 0 | 1 | 1 | |
| 29 | – | 0 | 0 | 0 | 0 | 0 | 0 | 1 | |
| 30 | 1 | 0 | 1 | 0 | 0 | 0 | 1 | 0 | |
| 31 | 1 | 0 | 1 | 0 | – | 0 | 0 | 0 | |
| 32 | 1 | 0 | 1 | 0 | 1 | 0 | 1 | 0 | |
| 33 | – | 0 | 0 | 0 | 1 | 0 | 1 | 0 | |
| 34 | 0 | 0 | 1 | 0 | 1 | 0 | 1 | 0 | |
| 35 | 0 | 0 | 1 | 0 | – | 0 | 0 | 0 | |
| 36 | 0 | 0 | 1 | 0 | 0 | 0 | 1 | 0 | |
| 37 | – | 0 | 0 | 0 | 0 | 0 | 1 | 1 | $C_3$ |
| 38 | 1 | 0 | 0 | 1 | 0 | 0 | 0 | 1 | |
| 39 | 1 | 1 | 0 | 0 | – | 0 | 0 | 0 | |
| 40 | 1 | 0 | 0 | 1 | 1 | 0 | 0 | 1 | |
| 41 | – | 0 | 0 | 0 | 1 | 1 | 0 | 0 | |
| 42 | 0 | 0 | 0 | 1 | 1 | 0 | 0 | 1 | |
| 43 | 0 | 1 | 0 | 0 | – | 0 | 0 | 0 | |
| 44 | 0 | 0 | 0 | 1 | 0 | 0 | 0 | 1 | |
| 45 | – | 0 | 0 | 0 | 0 | 1 | 0 | 1 | |
| 46 | 1 | 1 | 1 | 0 | – | 0 | 0 | 0 | |
| 47 | – | 0 | 0 | 0 | 1 | 1 | 1 | 0 | |
| 48 | 0 | 1 | 1 | 0 | – | 0 | 0 | 0 | |

Fig.22

INVENTORS
MATTHIJS BEUN
PIETER REIJNIERSE

BY [signature]
AGENT

INVENTORS
MATTHIJS BEUN
PIETER REIJNIERSE
BY
AGENT

INVENTORS
MATTHIJS BEUN
PIETER REIJNIERSE

BY

AGENT

METHOD OF AND DEVICE FOR PREPARING CHARACTERS FOR RECOGNITION

The invention relates to a method of preparing characters for recognition, which are imaged on a two-dimensional regular pattern of positions, a character position being distinguished from a background position by digital information present. The characters are skeletonized for removal of redundant information. The information of a character position is changed into that of a background position until a skeleton character is obtained whose stroke elements consist of single series of character positions which succeed each other in accordance with an adjacency criterion. The skeletonizing is performed in cycles in which the positions of the character field are considered according to a regular sequence. Skeletonizing is performed because a large portion of the imaged information is redundant. After removal thereof, the character can be more readily recognized by an automatic read unit. Furthermore, it was found that the information of the significant points of the skeleton character, particularly junctions and end points, can be readily used as a basis for recognition. It may be that skeletonizing is overdone, so that essential elements of the character are lost. If skeletonizing is less severe, sometimes redundant strokes and short stroke elements are found to remain. Consequently, in the latter case these short stroke elements are removed.

A method of skeletonizing is known from U.S. Pat. No. 3,196,398, in which the blackness of each character position is indicated by a two-bit binary code. Three blackness levels exist, while the information "00" denotes a background position. Skeletonizing is performed in three cycles: in the first cycle, it being possible to remove only the positions having the smallest blackness value, provided this does not cause an interruption of the characters, in the second cycle, only the points having the next higher blackness value being removed, and in the third cycle, only the positions having the highest blackness value. This method can offer favorable results, but also has drawbacks. First of all, the blackness of a stroke element may vary asymmetrically so that this stroke element is also skeletonized asymmetrically. This also applies, if the gradation of the blackness is slight so that all character positions have the same blackness value; this may, of course, also be applicable to only a portion of the character. The decisions as regards the removal of character positions will usually be taken consecutively, for example, by scanning the pattern one line after the other from left to right. In that case, only the extreme right-hand character position of a stroke element of the character crossing this line will be retained, so that distortion arises. However, if said stroke element terminates on that line it is truncated. If the matrix is further scanned from the top downwards, such a stroke element may be truncated from its upper end downwards, one line after the other, so that the skeleton character may become unrecognizable. The invention was conceived in order to make the skeleton character approximate the heart lines of the character and, moreover, to be able to remove all redundant information so as to enable detection of special points of the skeleton characters, and removal of short projecting stroke elements. The invention is characterized in that, said cycles are divided into at least one cycle of a first mode, which is followed by at least one cycle of a second mode. The first mode character positions are situated at the edge of the character, and are marked in accordance with an edge criterion by associating additional information with the information of these character positions, after which said character positions thus marked, are removed or are retained, respectively, on the basis of an indispensability criterion. During a cycle of said second mode, all character positions are tested against an indispensability criterion, after which they are removed or retained, respectively, on the basis of an indispensability criterion, it subsequently being counted how many of said series start from all character positions of said skeleton characters in order to determine end points, connection points and junctions in the skeleton characters. The additional information is associated with the information of said character positions. At least one series of the series of character positions originating from a junction is completely removed, if the span length of that series from its end point to a junction, measured as a number of positions, does not exceed a given value. It is possible for said junction to change over into a connection point, after which said additional information of the original junction is changed accordingly. As regards the skeletonizing, the character is symmetrically skeletonized due to the use of said edge criterion. By testing all characters against the indispensability criterion in a cycle of the second mode, a maximum amount of redundant information is removed and the pure heart line remains.

The increased marking of character positions in order to enable their removal is known from U.S. Pat. No. 3,339,179. However, in this patent, the criterion for marking is very complicated and does not rely on information concerning the edge of a character, but rather upon whether a character position is situated near the center of a stroke element, or at a three-stroke or four-stroke junction. Moreover, FIG. 3 of this Patent shows that various redundant character positions are still present in the skeleton character, which might have been removed. According to the present invention, all character positions are tested in a cycle of the second mode, so that all remaining character positions satisfy the indispensability criterion. At the end of the cycles of the first mode, the character is identical, apart from a small number of character positions, to the skeleton character to be formed. After that, no further character ends may be shortened. During cycles of said first mode, it is desired, however, to remove any small projections.

By perfectly performing the skeletonizing according to the method of the invention, the search for significant points is facilitated. By the removal of short projections, the number of significant points is reduced to its proper value. As the short projections are removed anyway, skeletonizing need not be overdone. Consequently, all parts of the invention are accurately matched.

The following case occurs if said regular pattern is a matrix composed of rows and columns: a small matrix is used for testing against the edge criterion. If the matrix is scanned in a cycle, for example, one line after the other, from left to right, it may be that a stroke element of the character extends to the left approximately horizontally with ends free, such as, for example, the horizontal portion of a character "7." It may then occur at the end of said stroke element, many character positions which satisfy the edge criterion, so that there will never be an interruption. However, if this concerns too large a number of character positions, the horizontal stroke element may be unduly eroded. In order to prevent this, while maintaining the above-mentioned advantages, an advantageous method is utilized in accordance with the invention. During cycles of said first mode, an indispensability criterion applies which comprises at least one first sub-criterion which prevents any removal, and which would cause an interruption. During cycles of said second mode, use is made of a second sub-criterion, in addition to the said first sub-criterion, which prevents removal of a character position tested against said indispensability criterion. If this character position has only one neighboring character position, which means that the tested character position constitutes an end of a character, which end might be unduly eroded by removal of said tested character position, said indispensability criterion comprises a third sub-criterion, during at least one cycle of at least one of said two modes. This third subcriterion determines whether a character position tested against said indispensability criterion forms part of a number of neighboring character positions forming a block which is to be tested against said indispensability criterion. It is possible for said block to be further limited by a number of background positions, so that said block can constitute an end of a character which might be unduly eroded by removal without said first and second subcriterion taking effect. The third sub-criterion changes said additional information of at least one of the character positions to be tested, and forms part of said block, so that this character position is not tested against said indispensability criterion.

For removal of said short projecting stroke elements, a preferred embodiment of the method according to the invention, is characterized in that said span length is measured according to the shortest possible connection which might apply according to said adjacency criterion. Consequently, no more weight is attached to a curved series than to a straight series having the same distance between the end and the next junction.

Another advantageous method according to the invention, is characterized in that said span length is measured by counting the number of possible character positions of said series to be removed, For counting successive character positions, simple processes may be used.

In order to enable said significant points to be found in a simple manner, use is made of the fact that each position has a number of neighboring positions which form, possibly in conjunction with a number of other positions, (which number may include void positions) a ring about a position. An advantageous method according to the invention, is characterized in that during a cycle along the positions of that ring about a character position, it is counted how often a character position is directly followed by an other position. From this said number of series of character positions starting from that character position can be determined. It is possible for a loop consisting of character positions to occur, which is a series of character positions succeeding each other in accordance with said adjacency criterion. This series has the smallest possible length in said regular pattern, and the same symmetry as said regular pattern, and furthermore is shorter than said ring. All but one of the character positions of that loop is marked as connection points, and the remaining character position is marked as a junction, from which as many of said series start as the loop has character positions.

By utilizing the criterion that a character position, which is directly followed by a background (or void) position, signifies a series of character positions which start from the central character position, a corresponding treatment is obtained for other patterns, for example, having three, four, six or eight neighbors per position. The occurrence of said loop signifies a composite junction. In the case of four, six and eight neighbors, a ring has eight, six and eight positions, respectively, and a loop has four, three and four positions, respectively. If said composite junctions occur, i.e. connection elements of characters where more than one character position can be designated as the point from which the series of character positions start, the correct number of junctions can be found by marking the character positions of the associated loop. In theory, it is possible to design very complicated combinations of many junctions, in which an error occurs. It was discovered, however, that these cases did not occur with a large number of test characters having a complicated structure.

It may be of importance to reduce the number of junctions. To this end, an advantageous method is utilized in accordance with the invention. At least two junctions which are situated within a given maximum distance from each other, (it being possible for said distance to be zero) can be joined, wherein the total number of said series exceeding two per junction is associated as an additional mark with a character position. The newly marked character position is marked at least as a four-stroke junction. In the case of a finite distance, one of the junctions can be made into at least a four-stroke junction, but it may also be another character position, for example, that which is situated nearest to the center of gravity of the figure formed by said junctions. In this case, these junctions may also have a different weight. It can also be ensured, that the total number of series starting from the composite junction remains the same. However, it is also possible, that never more than, for example, four series thereof are taken into account.

The invention also relates to a device to be used for preparing characters in accordance with the aforementioned method. The characters are imaged on a carrier. The device comprises a detector which images the information of the characters in a storage device. This information is stored as that of character positions and background positions, respectively, said information being treated by a skeletonizing device, so that the information changes into information of skeleton characters. The stroke elements of these characters consist of series of character positions, which succeed each other in accordance with an adjacency criterion. Skeletonizing is controlled in cycles by a control unit. The detector is, for example, a flying spot scanner and the storage device may be, for example, a matrix store or a shift register. In any case, the information is regularly arranged so that the stored information of various storage elements can be prepared. Character positions are stored, for example, as ones, and background positions are stored as zeroes. The reduction of the number of ones has two possible advantages: on the one hand, the redundance is reduced without indispensable information being destroyed, and on the other hand, this reduced information can be stored in a smaller store, so that storage space can be saved. In order to be able to subsequently find significant points of the skeleton character, and to remove short projecting stroke elements, a device according to the invention is characterized in that said control unit has two positions: one for performing at least one cycle of a first mode, and one for performing at least one cycle of a second mode. In a cycle of said first mode, at least the information of the character positions can be applied, together with the information of the positions neighboring those character positions, to a first deciding unit in which an edge criterion is incorporated. The first deciding unit associating additional information with the information of these character positions which have satisfied the edge criterion. Afterwards, both types of information can be applied to a second deciding unit, together with the information of the positions neighboring those character positions. The second deciding unit incorporates a logic indispensability criterion, and said second deciding unit changes the information of said character positions into that of a background position, if the edge criterion has been satisfied, but the indispensability criterion has not been satisfied. It is possible in a cycle of said second mode to apply the information of all said character positions which are still present to an input of said second deciding unit. The second deciding unit ignores whether the edge criterion has been satisfied or has not been satisfied, and changes the information of said character positions into that of background positions, if an indispensability criterion has not been satisfied. A counter is provided, which compares the information of the positions of a ring of positions about a character position. It is possible for said ring to comprise, besides positions which neighbor the position in the center, also other positions which may include void positions. The counter, during a cycle along said ring, will count how often a character position is directly followed by a background position or a void position. The counter generates an output signal corresponding to this number. A detector is provided which can be set for the detection of end points, connection points and junctions, respectively, by means of a setting signal. The detector supplies an equality signal when the kind of point for which the search was made is found. In reaction to this, a provided control unit interrogates the information of a number of positions, (it being possible for said number to be zero) during at least one search series. It is possible during a search series of a first kind to isolate the information of an end point by storing the information in an isolation store. It is possible during a search series of a second kind to isolate the information of a connection point by storage of information in said isolation store. The search series of the second kind is started when the control unit receives an equality signal during a search series of said first kind. A span length defining unit is provided, which is incorporated in said isolation store, and which has a capacity which is measured in a number of character positions. The defining unit supplys a signal, when the span length of a series of character positions to be found is reached. This signal is received by the unit in order to prevent the start of a next search series of said second kind. A counter which compares the information of the positions of the ring can be readily realized. A detector of this kind may also be of a simple construction.

If the information of the positions is applied to the deciding units in a fixed sequence, a preferred embodiment according to the invention is realized. The second deciding unit comprises a first and a second circuit for a first and a second indispensability sub-criterion, respectively. It is possible to activate said circuits by said control unit, said control unit activating only the first circuit during cycles of said first mode, but activating both circuits during cycles of said second mode. The first circuit supplys a signal if removal of a character position would cause an interruption, said second circuit counting the number of character positions neighboring said character position, and supplying a signal if this number amounts to one. This means that the character position constitutes an end of a character which might be unduly eroded by removal of said character position. The second deciding unit is capable of preventing the removal of the relevant character position under the control of at least one of said signals. The deciding unit comprises a third circuit for a third indispensability sub-criterion, which compares the information of character positions with the information of at least three character positions neighboring this character position. The third circuit supplies a signal, if these character positions, forming a block, are all provided with said additional information, and furthermore may have a number of background positions as neighboring positions so that said marked block can constitute an end of a character. This marked block might be unduly eroded by removal of said character positions without the sub-criteria generated by said first and said second circuit having the possibility of becoming effective. Therefore, it is possible to change the additional information of at least one of said marked character positions, by said signal of said third circuit, such that this character position is not tested against said indispensability criterion. Consequently, the ends of the skeleton character are not at all shortened during a cycle of said second mode. Also the undue removal of a block of character positions, to be tested against the indispensability criterion, is thus avoided.

A preferred embodiment according to the invention is further characterized in that said span length defining unit defines an area consisting of a number of positions around a central position, the number of positions in a series which starts in said central position, and which terminates at a position constituting a limit of said area, always being at least equal to said span length. In this way, no more weight is attached to a curved series of character positions than to a straight series having the same distance between the end and the next junction.

Another preferred embodiment according to the invention is further characterized in that said span length defining unit comprises a counter which counts the number of character positions from which information is isolated. The counter supplys a signal when a given position corresponding to a span length is reached. A control unit receives this signal in order to prevent a next search of said second kind. By introducing such a counter, said span length defining unit is given a very simple construction.

Another preferred embodiment according to the invention is further characterized in that a loop detector is provided which receives the information of all character positions forming part of a loop. The loop consists of a series of character positions which succeed each other in accordance with said adjacency criterion. The series has the smallest possible length in said regular pattern, and thus has the same symmetry as said regular pattern, and furthermore is shorter than said ring. The loop detector generates a junction output signal, when a loop is detected, so that the stored information of one of the character positions of said loop is changed into that of a junction from which as many of said series of character positions start as said loop has character positions. The other character positions of that loop are changed into connection points. A loop detector of this kind can be readily realized. Moreover, in this way, the total number of series starting from a junction is virtually always found to be equal to the number found by intuition.

In order to reduce the number of junctions without the total number of said series being unduly reduced, another preferred embodiment according to the invention is characterized in that a coincidence detector is provided, which detects whether at least two junctions are situated within a given maximum distance (it is possible for said distance to be zero). When these junctions are found, the detector supplys signals to a joining unit which also receives the stored information of those junctions. The joining unit associates additional information with the information of one character position, which is then at least marked as a four-stroke junction, and changes the other junctions detected by the coincidence detector into connection points. The recognition is then often facilitated.

In order that the invention may be readily carried into effect, some embodiments thereof will now be described, in detail, by way of example, with reference to the accompanying diagrammatic drawings, in which.

Figure 7:
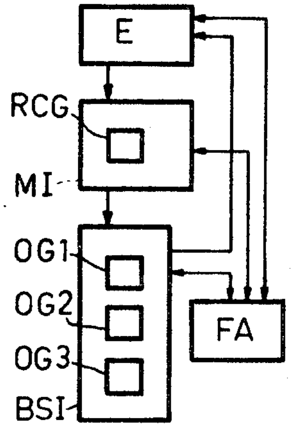
Figure 8:
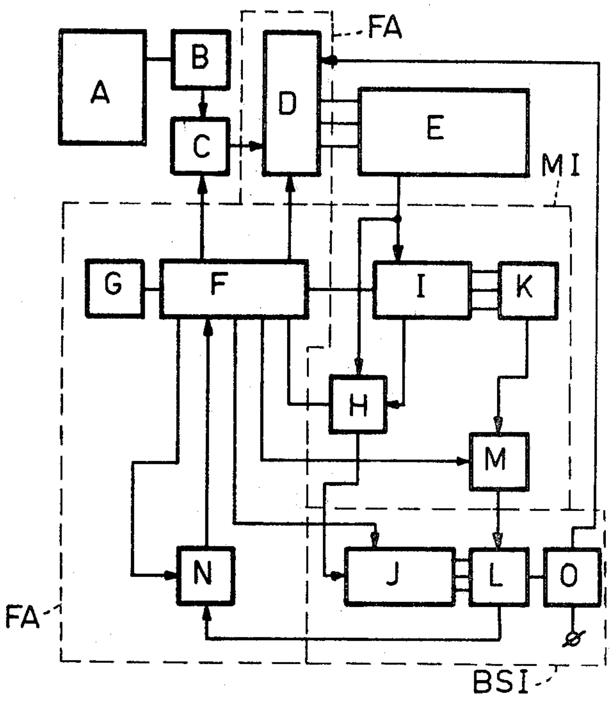
Figure 9:
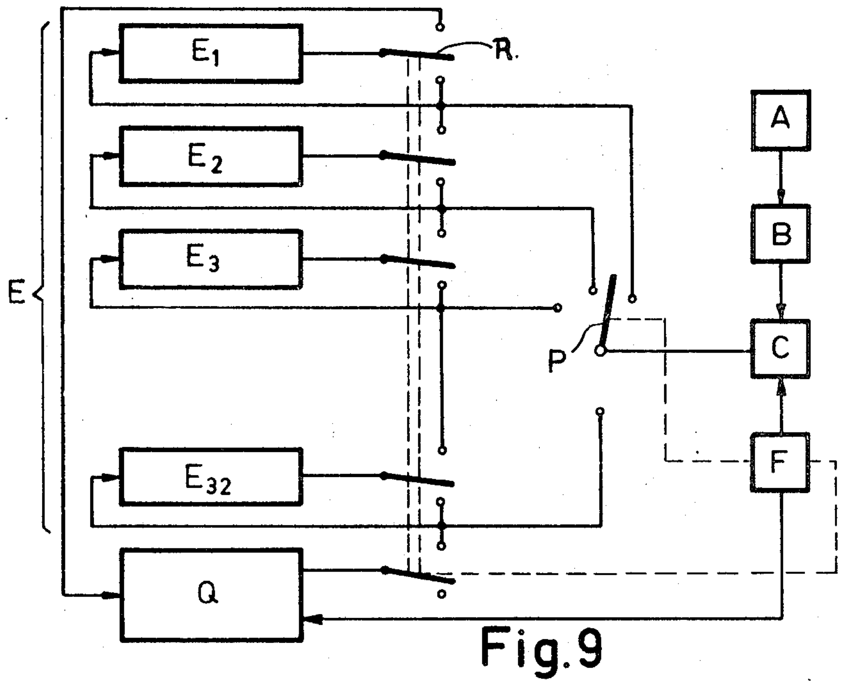
Figure 10:
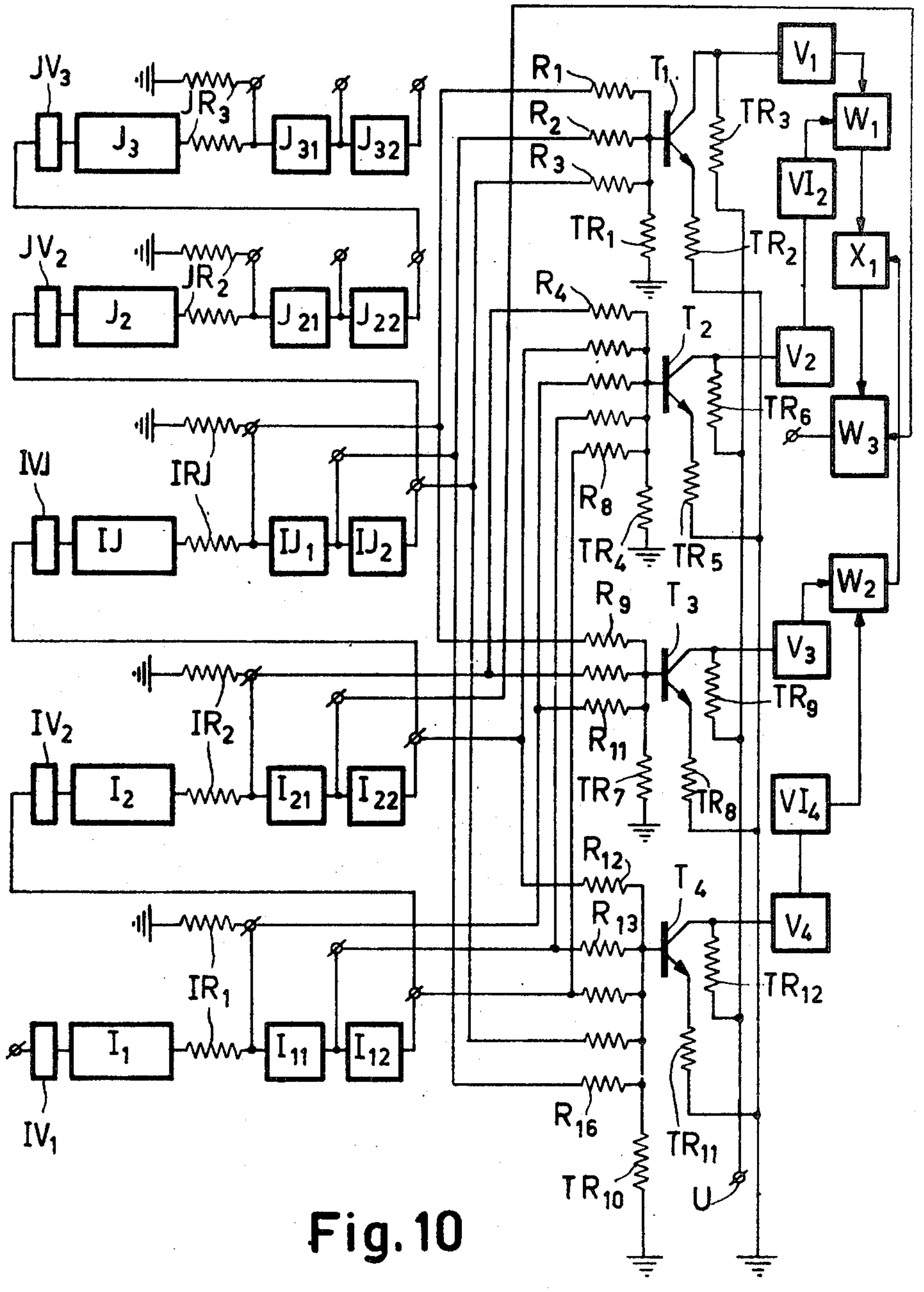
Figure 11:
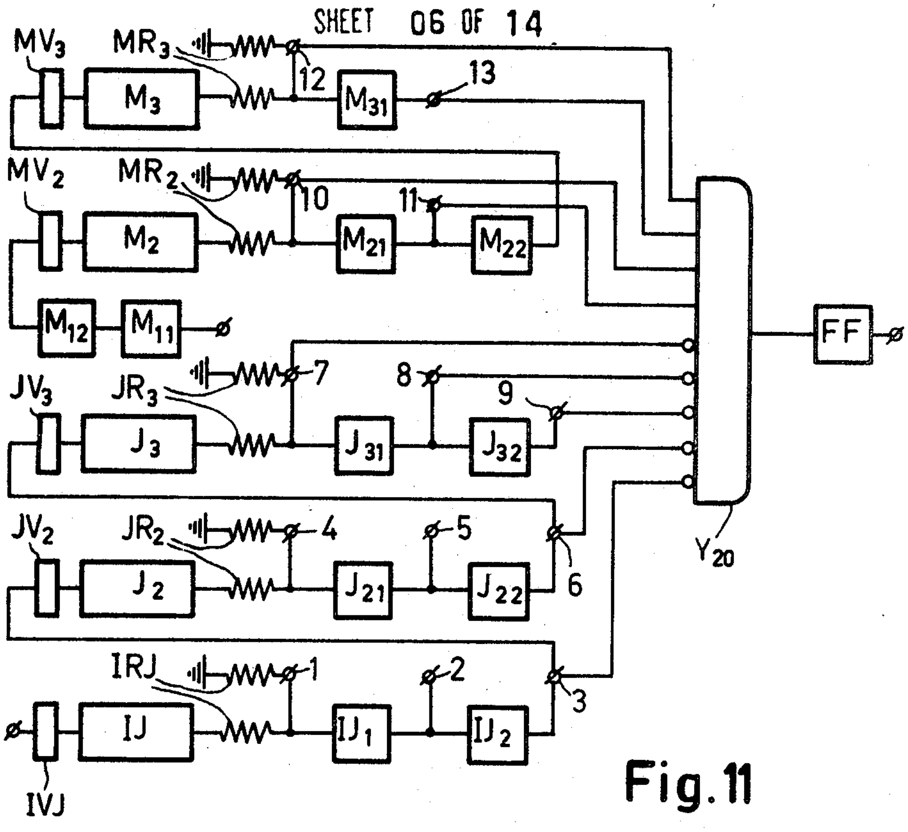
Figure 12:
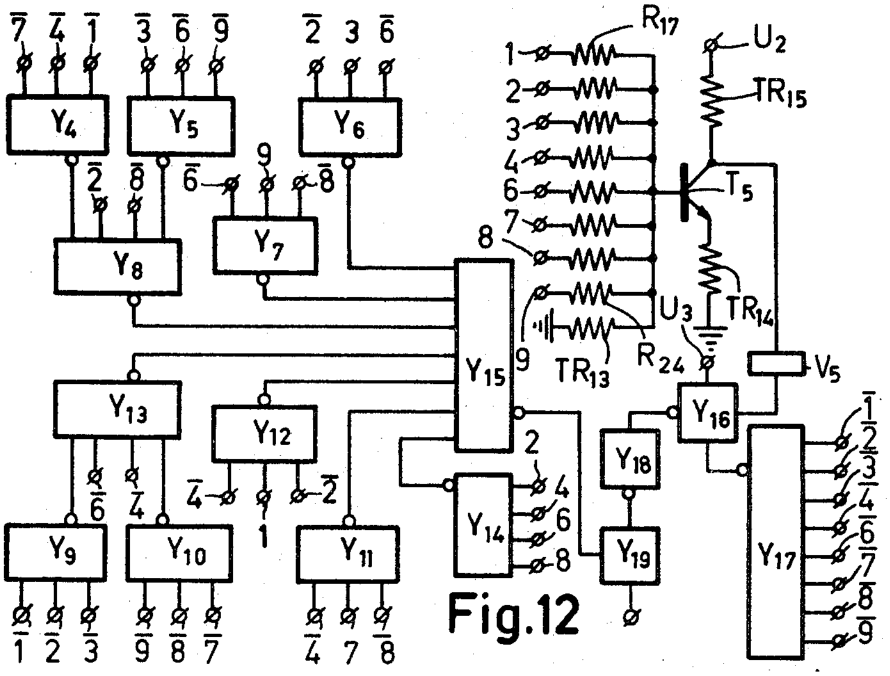
Figure 13:
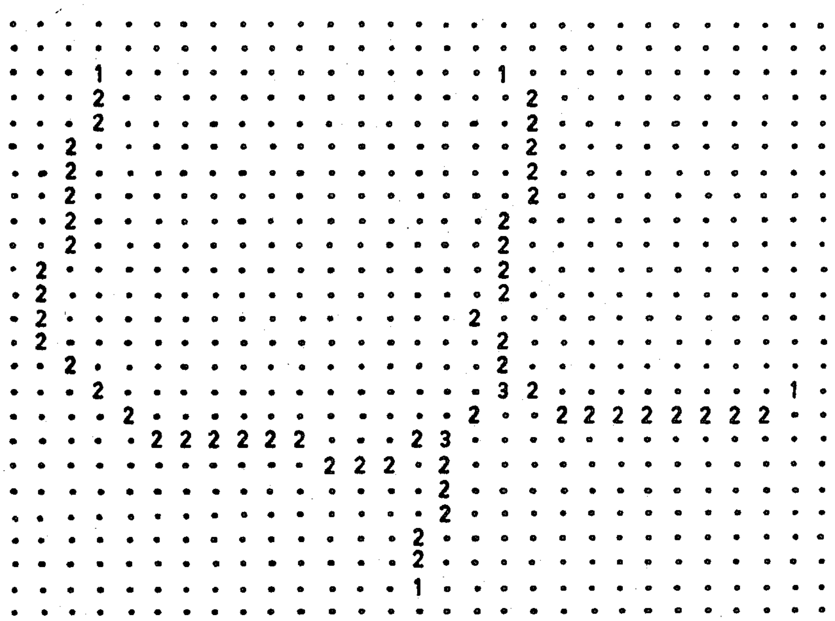
Figure 14:
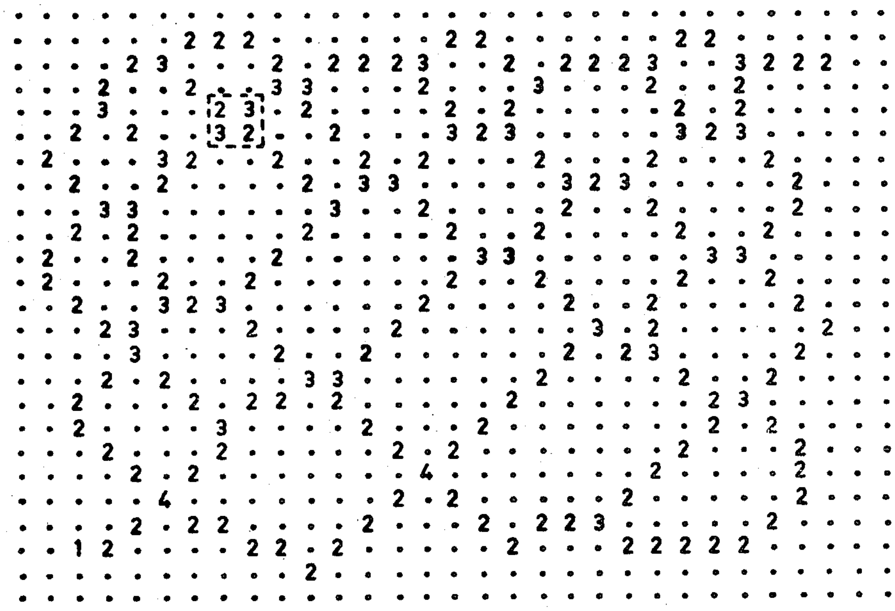
Figure 15:
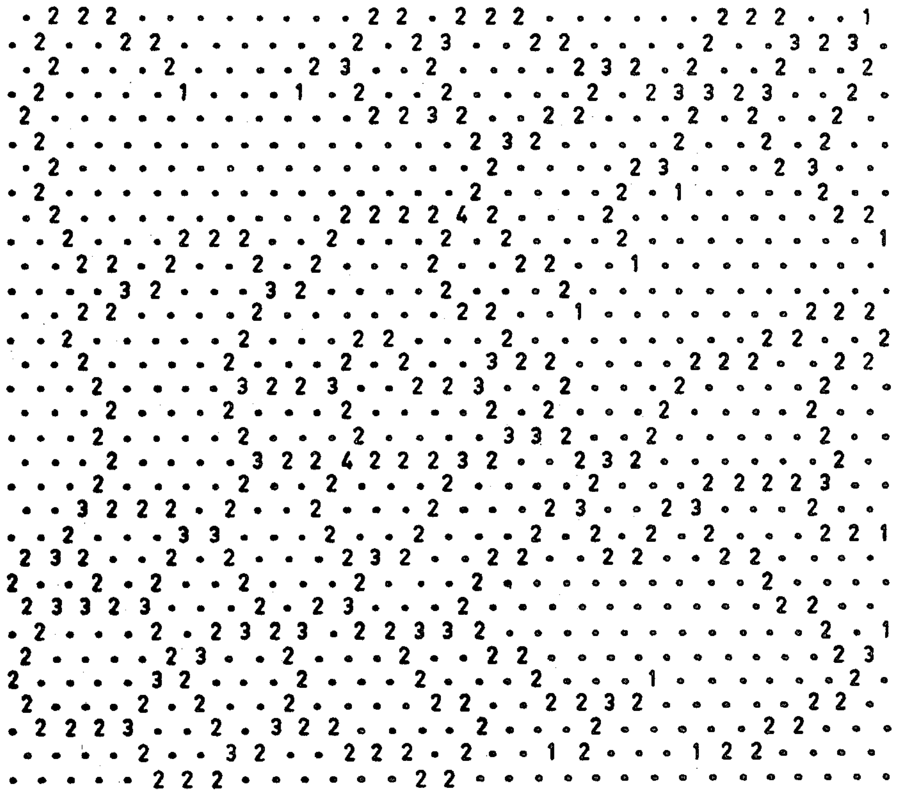
Figure 16:
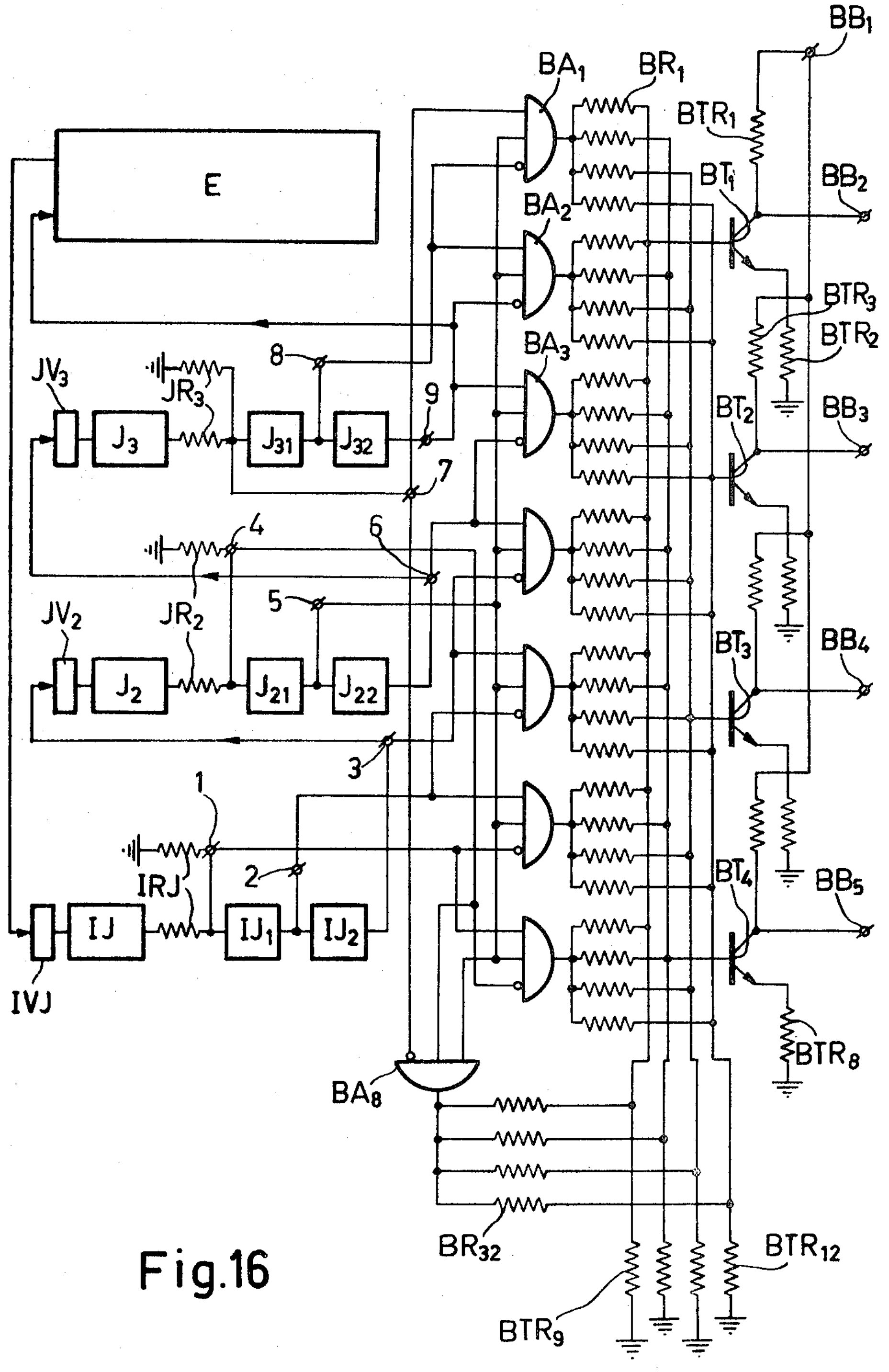
Figure 17:
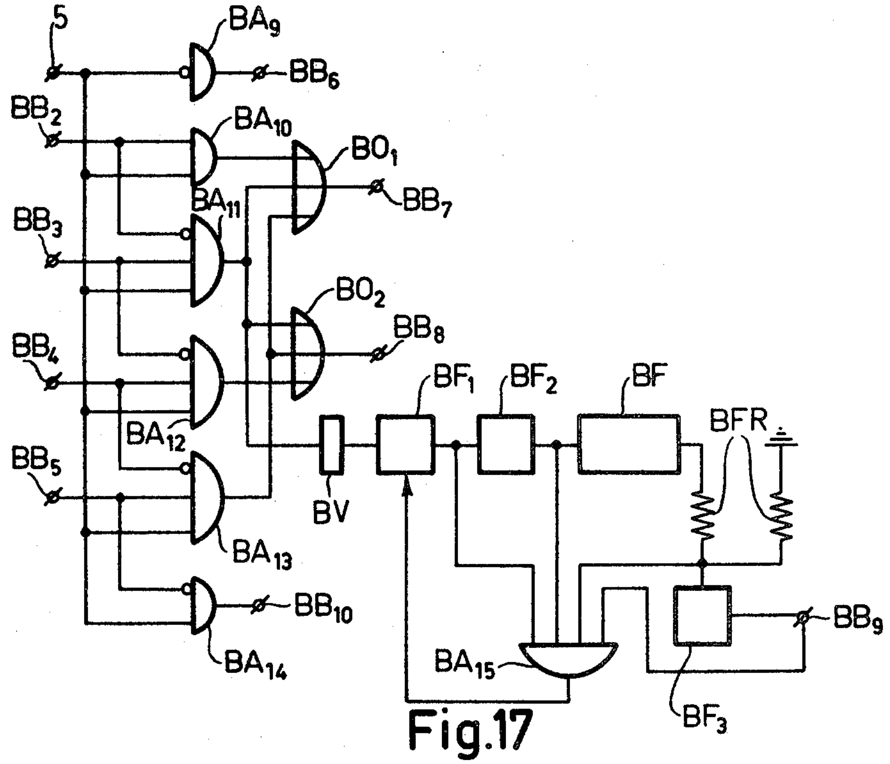
Figure 18:
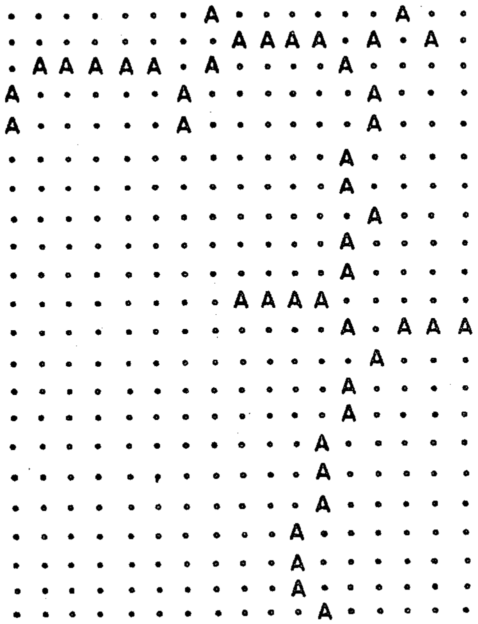
Figure 19:
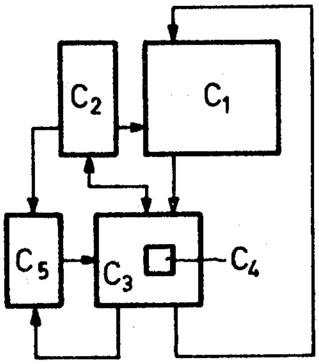
Figure 20:
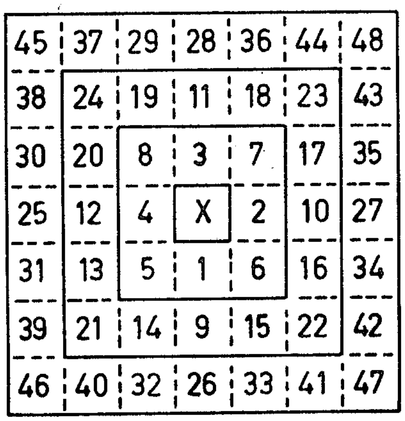
Figure 21:
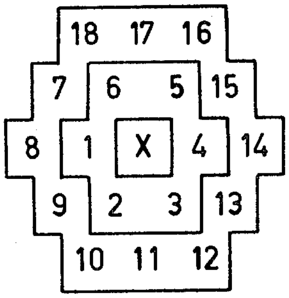
Figure 23:
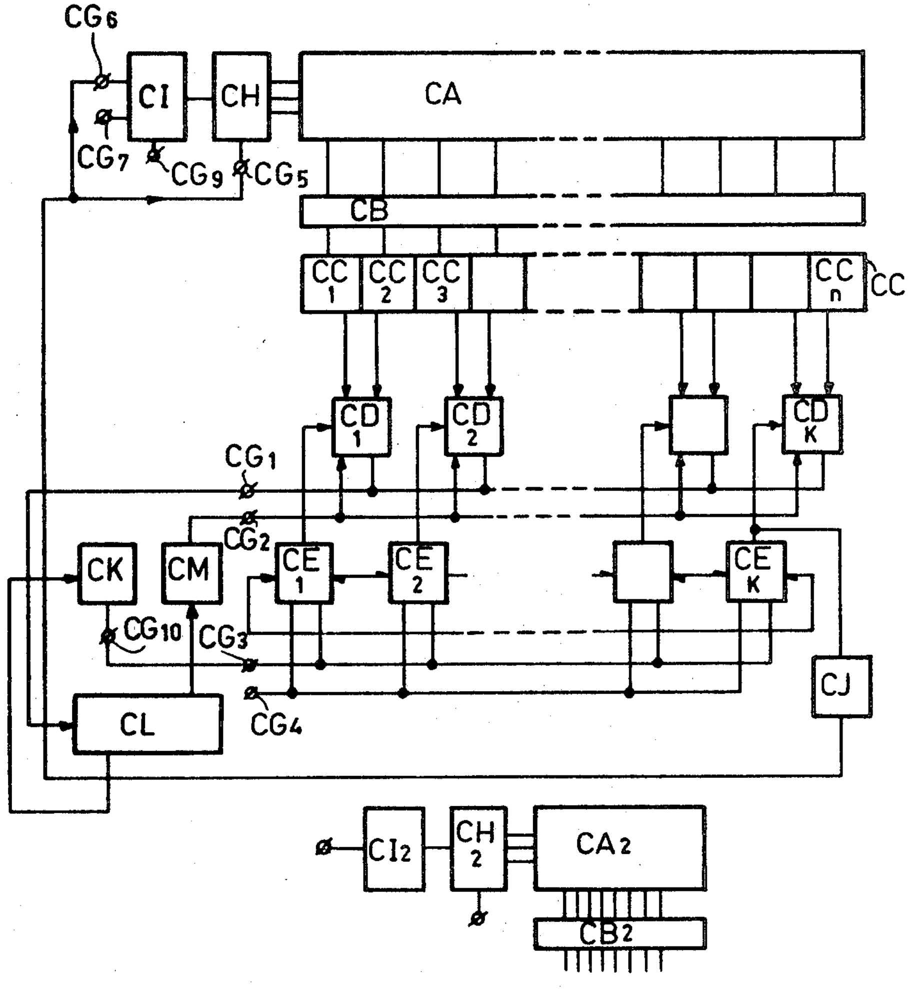
Figure 24:
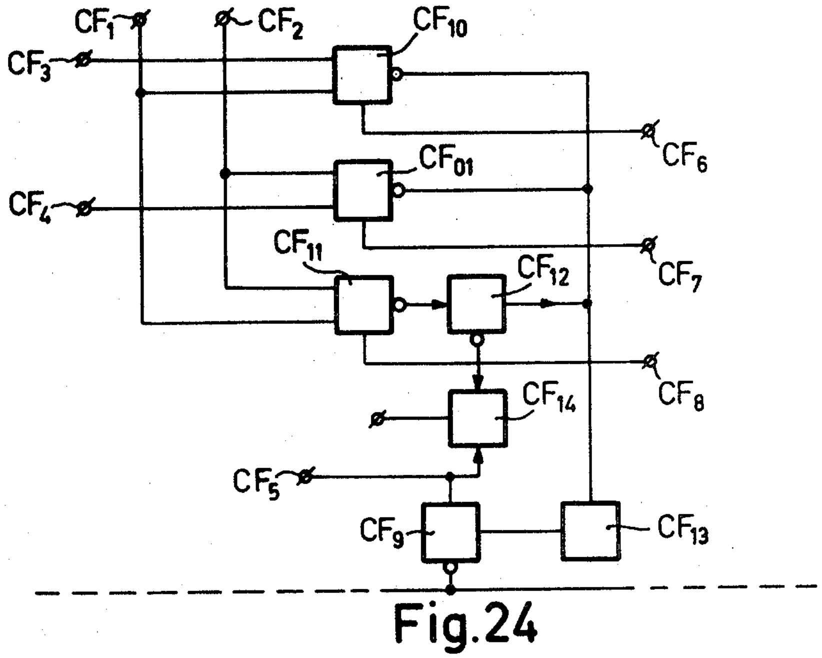
Figure 25:
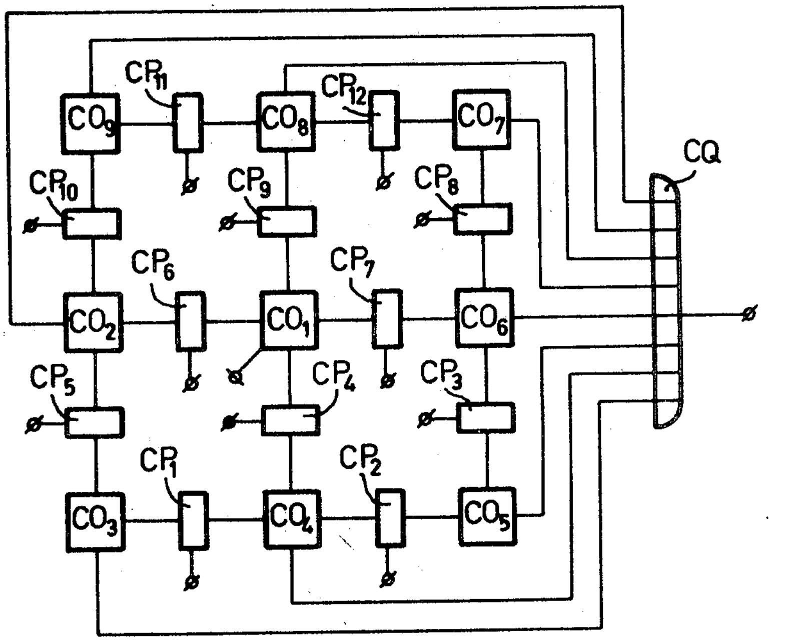

FIGS. 6*a* to *d* show four possible patterns of positions;

FIG. 7 shows a block diagram of a skeletonizing device;

FIG. 8 shows a block diagram of a portion of FIG. 7;

FIG. 9 shows a block diagram of a main store, a marking store and a skeletonizing store;

FIG. 10 shows a block diagram of the marking store having a first logic unit;

FIG. 11 shows a block diagram of a second logic unit;

FIG. 12 shows a diagram of an additional portion of the second logic unit, together with the skeletonizing store and the mark store;

FIG. 13 shows a character "4," it being indicated how many series of character positions start from each character position;

FIG. 14 indicates the number of series the same as FIG. 13 for a complicated test character;

FIG. 15 indicates the number of series the same as FIG. 14 on a matrix having six neighbors per position;

FIG. 16 shows a portion of a treatment device;

FIG. 17 shows another portion of a treatment device having a quadrangle detector;

FIG. 18 shows a skeleton character "7" having projections;

FIG. 19 shows a block diagram of a device for removing projections;

FIG. 20 shows an area which is interrogated around a found junction;

FIG. 21 shows an interrogated area in a hexagonal grid;

FIG. 22 shows a plurality of stored information for controlling the procedure of FIG. 20;

FIG. 23 shows an interrogation unit;

FIG. 24 shows an embodiment of a detector;

FIG. 25 shows a device for defining a span length.

Figure 1:
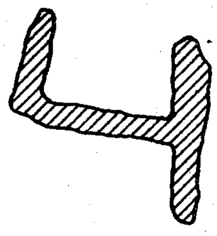
FIG. 1 shows a hand-written character "4,"
Figure 6A:
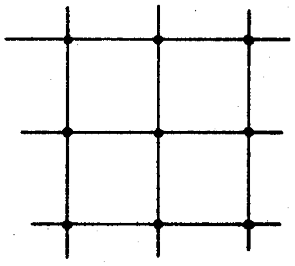
Figure 6B:
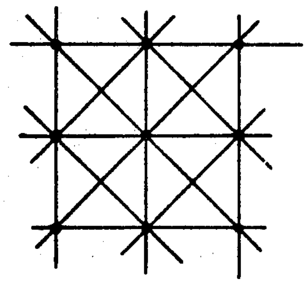
Figure 6C:
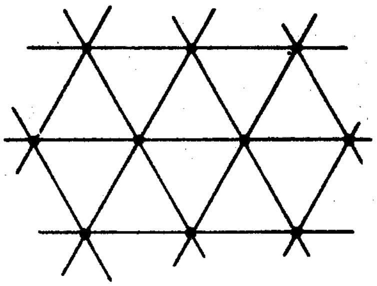
Figure 6D:
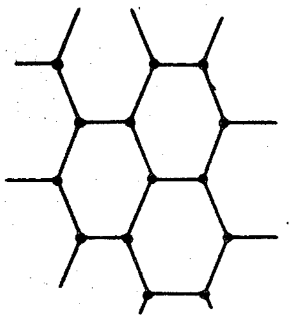
Figure 2:
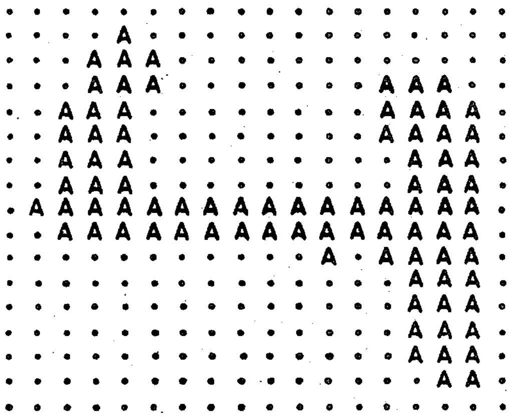
FIGS. 2 to 5 show the processing stages in the case of skeletonizing.
Figure 3:
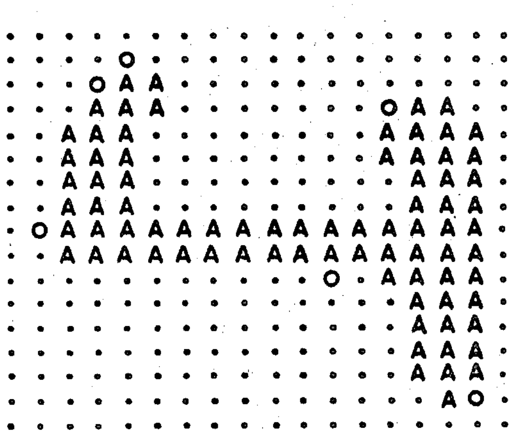

FIG. 1 shows a hand-written character, the information being bi-valued, binary black or binary white. FIG. 2 shows the image of this character on a square matrix, the character positions being denoted by a letter A, the background positions being denoted by a dot. In FIG. 3 the smoothing of the edge is illustrated. In this figure, and also hereinafter, a character position is considered together with the information of the eight neighboring positions in a 3×3 matrix (neighbors). The criterion for smoothing requires that a character position be removed, if it has less than four neighbors. A corresponding method is used for filling voids. The invention, however, does not relate to smoothing, which may also be omitted.

Figure 4:
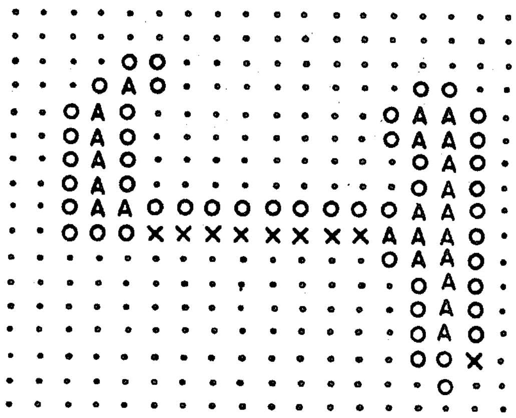

FIG. 4 shows the result of a first skeletonizing cycle. First, all positions satisfying the edge criterion are marked: if less than two character positions occur in the first column of the said 3×3 matrix, and more than three character positions occur in the remainder of the matrix (including the character position in the center), the character position in the center is marked. A similar method is followed by always counting (successively or simultaneously) the number of character positions of the last column, the number of the last row, and the number of the first row, and also the number of character positions in the remainder of the matrix. If the edge criterion is satisfied in at least one of the four cases, the character position in the center is marked: this is indicated in FIG. 4 by a cross or a circle in the relevant position. Background positions are always denoted by dots. After all positions satisfying the edge criterion have been marked, all marked positions are subsequently reconsidered and removed, if this does not cause an interruption between two marked, or not marked, character positions still present. Upon successive consideration of the marked character positions, one line after the other, from left to right, starting at the top, a first interruption appears to arise at the lower line of the horizontal stroke element of the "4"; consequently, the relevant removals are invalidated, which is denoted by crosses in the relevant character positions. Finally, a mark has also been invalidated in the right-hand lower corner. This is because, an interruption would otherwise arise between the vertical stroke element at the right, and the marked but still present character position on the lower line. The latter is removed only upon scanning of the lower line. If a start where made at the bottom, no removal would have been invalidated in this case, which demonstrates that the shape of the skeleton character may be dependent upon the sequence in which the character positions are tested against the indispensability criterion. In the next cycle of the first mode, (FIG. 5) all character positions are considered again (crosses and circles). At the top of the right-hand vertical stroke element, a block of four character positions is marked, the removal of which will not cause an interruption, provided a start is made at the top. In this case removal would not be fatal for recognition, but there are also cases where such a double column extends, for example, as far as the horizontal stroke element and then this whole column would disappear. Consequently, when considering the character position of a block of four marked character positions which is situated at the top left, the marking of the character position situated at the top right is invalidated (so that the latter is not tested against the indispensability criterion) under the condition, that the other five positions of the 3×3 matrix are background positions. Consequently, during this cycle five character positions are removed, and five other removals are prevented. The latter can always be effected by removing the marking. During a subsequent cycle, no further character positions are marked, but it is obvious that the character position surrounded by a solid-line square at the left is redundant, which may make recognition more difficult. For example, a more severe edge criterion may be used: if less than two character positions are present in the first column of the 3×3 matrix, and more than two character positions are present in the remainder (including the central character position), the central character position is marked. However, in that case more severe criteria are also to be drafted, so as to counteract erosion of ends, but it is difficult to predict whether projecting character positions constitute an end or not. Using the main thought of the invention: marking all character positions in a cycle of a second mode, excellent results are realized.

Figure 5:
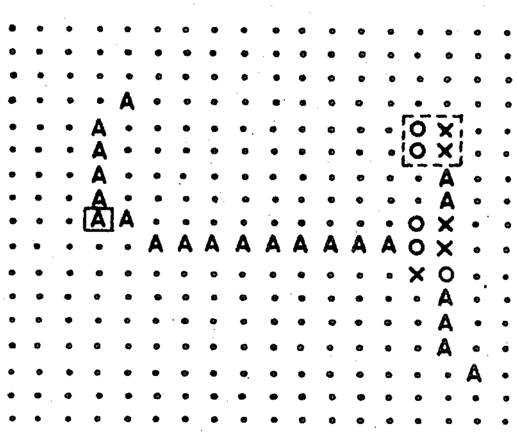

The second cycle of the first mode may also be followed by a third one. FIG. 5 shows, that in a third cycle, no further position is removed, so that this last cycle is superfluous. The completion of cycles at the first mode can be terminated, if at the most, a number of character positions was removed in the last completed cycle of the first mode. In the case under consideration, this number may be set, for example, at eight. In that case, two cycles of said first mode are required. If the number has been set, for example, at 50, only one would be required (as 48 positions are removed in the first cycle). Acceptable skeleton characters can thus be found.

The number may be permanently chosen, for example, but it can also be derived from the results of one or more previous cycles. Subsequently, one cycle of a second mode is completed, in which one further character position can be removed (shown in the solid-line square). After that, the skeleton character is ready for further processing and/or recognition.

FIGS. *6a*, *6b*, *6c*, and *6d* show the most commonly used patterns of positions, each position having four, eight, six and three neighbors, respectively. Other patterns can be formed therefrom, by varying the scale, for example, in that the elementary squares of FIG. *6a* are changed into parallelograms or rectangles.

FIG. 7 shows a block diagram of a device according to the invention, comprising a main store E, a marking unit MI, comprising an edge criterion generator RCG, and a deciding unit BSI, comprising three generators for three indispensability sub-criteria OG1, OG2 and OG3, and a main control unit FA. The information of the character is assumed to be stored in the main store E. Under the control of the main control unit FA, the information is applied to the marking unit MI. In this unit the information of a character position, and of any neighboring character positions of this character position, is tested against an edge criterion which is generated in the marking unit MI, by the logic edge criterion generator RCG. The result of this test is applied to the deciding unit, together with the information of the character position, and of any character position neighboring this character position. Depending on the signals from the main control unit FA, the information is tested against one of the indispensability sub-criteria generated by the generators OG1, OG2 and OG3, after which it is decided whether or not the character position under consideration may be removed. Subsequently, the information of the remaining character positions is returned to the main store E. One cycle is then completed, and it is determined whether it was a cycle of the first, or of the second mode, by the setting of MI, and the use of the indispensability criteria. The main control unit FA may also receive signals from E, MI and BSI, as is indicated by the arrows. The main control unit FA can adjust its operation on the basis of these signals, for example, starting, changing over from the first to the second mode, and stopping.

FIG. 8 shows a more detailed block diagram of a device for performing the method according to the invention, and comprising a carrier A with characters to be recognized, a detector B, a buffer store C, a switching network D, a main store E, a control unit F, a clock G, an interconnection unit H, a marking store I, a skeletonizing store J, a logic unit K, a second logic unit L, a mark store M, a bistable device N, and an output unit O. In addition, broken lines denote which components form part of the main control unit FA, the marking unit MI, and the deciding unit BSI shown in FIG. 7. The carrier A is, for example, a sheet on which characters are written in ink of a contrasting color. The detector is, for example, a flying spot scanner which each time scans a line of a character from the top downwards. This information is written in a store, one line after the other, on the basis of a criterion, which in its simplest form is bi-valued, i.e. "occupied" or "void." The buffer store C is, for example, a shift register in which the information of a line can be stored and which may contain, for example, 32 bits. The main store E may also be constructed as a shift register. The clock G supplies pulses at regular intervals to the control unit F, which controls the further course of events. The buffer store C is sometimes required for adapting the properties of the detector and the main store E to each other. If E is also a shift register constructed, for example, according to MOST-techniques, and therefore requiring, for example, a fixed clock pulse frequency, this clock pulse frequency may differ from the changing frequency of the line points. For example: the sweep frequency of the flying spot scanner is constant, but the interrogation instants are controlled such that there are always 32 interrogation points per character line, independent of the character dimensions. After completion of one line of the character, the information of that line is transported via the switching network D under the control of the control unit F. The character may consist of, for example, 32 lines of 32 bits each. This was also the case in the FIGS. 2 to 5, but in these figures part of the matrix is omitted so as to save space. When all information of the character has been stored in the main store E, skeletonizing commences, redundant information being separated. For this purpose, a circuit is formed, for example, by loopwise connection of the main store E, the marking store I, the skeletonizing store J, the logic unit L and the output unit O. This can be effected, for example, by connecting all said stores as a series shift register. Under the control of the clock pulses and the control unit F, the information of the character is circulated until it has returned in the main store E. The following operations are then effected. In the marking store I, the matrix points are marked, or are not marked, in accordance with an edge criterion comparing the information of a matrix point with the state of neighboring matrix points, which are either occupied or void. This is effected by the logic unit K, while the information whether or not a relevant matrix point is marked, is passed on to the mark store M.

The output of the marking store I is connected, via the interconnection unit H, to the input of the skeletonizing store J. In this store the information of marked points is compared with that of the neighboring points in accordance with an indispensability criterion. To this end, the mark of the matrix point under consideration, and possibly those of other matrix points, is applied from the mark store M to the second logic unit L. The latter unit tests against an indispensability criterion, and decides whether or not the matrix point may be removed. If it may be removed, the signal is applied to the bi-stable unit N. The information of the removed or non-removed matrix point is returned, via the output unit O, to the main store E and, if desired, is available on an output terminal of the output unit O. At the start of the described cycle, the bistable unit N was in the first position, so that all matrix points are first tested against the edge criterion by the logic unit K. If a point is removed, N receives a pulse from the logic unit L, so that it assumes the second position. After completion of the cycle, a cycle of the same type is performed and, moreover, the bistable unit N is reset to the first position. However, if no point is removed during a cycle, N is still in the first position at the end thereof. In that case, the output of the main store E is directly connected, in a subsequent cycle, to the input of the skeletonizing store J by the interconnection unit H, while the mark store M receives a pulse, or a pulse sequence, from the control unit F. This causes M to store the information of all points in a "marked" fashion. At the end of this cycle, the skeletonizing unit is stopped (after supplying the information of the skeleton character via the output unit O), and skeletonizing of a subsequent character commences.

According to FIG. 9, the main store E is composed of 32 shift registers of 32 bits. Also provided are the switches P and R, and the processing unit Q (corresponding to MI and BSI shown in FIG. 7). During writing-in, R is in the lower position and the information of the shift registers continuously circulates. The control unit F each time switches P one position further, so that a next shift register is written in. When the 32nd line has been written in, F sets the switch R to the upper position, so that all shift registers are connected in series with the processing unit Q.

FIG. 10 shows the marking store I which comprises 3 shift registers I1, I2 and IJ for 30 bits each. In series therewith, are each time connected two flip-flops I11, I12; I21, I22; and IJ1, IJ2. Provided between these shift registers and the flip-flops are the matching resistors IR1, IR2 and IRJ, and connected before the shift registers are the regeneration amplifiers IV1, IV2 and IVJ. FIG. 10 also shows the skeletonizing store J, comprising three shift registers, i.e. IJ, J2 and J3, with the associated flip-flops IJ1, IJ2; J21, J22; and J31, J32, resistors IRJ, JR2, JR3, and regeneration amplifiers IVJ, JV2 and JV3. The five shift registers are connected in series. FIG. 10 furthermore shows a portion of the logic unit K, which generates the edge criterion and which comprises 16 resistors R1...R16, and four transistors T1 . . . T4. The electrodes of the transistors are connected to the resistors TR1 . . . TR12, and hence to reference voltages (earth and terminal U) the emitter-followers V1 . . . V4, the inverters V12 and V14, the AND-gates W1, W2 and W3, and the OR-gate X1. Part of the edge criterion is: if the third column of a matrix comprising 3×3 character positions has less than 2 occupied positions and the remainder has more than three (including the central position), the central position is marked. This is achieved as follows: the information of the central character position is present on the output of I21, and is compared with the information of the outputs of IJ1, IJ2, I22, I11, I12, and across the resistors IR1, IR2, IRJ. The information arrives on the input of IV1, and is shifted further to the output of J32 under the control of clock pulses not shown. The character lines are scanned, for example, from left to right so that the character is stored in the main store in a left/right mirror-imaged manner, which also applies to the stores I and J. The last column of the 3×3 matrix, consequently, is present in the last bits of the shift registers I1, I2 and IJ, and is applied to the base of T3 via the resistors R9...R11. Similarly, the information of the flip-flops I11, I12, I22, IJ1 and IJ2 is applied to the base of T4 via the resistors R12 . . . 16. These kinds of information are always added in the form of currents. The resistors TR1 . . . 12 and the voltage on terminal U are specially proportioned. The relevant output signal is high for a character position and, consequently, a current flows through the associated resistor, for example, R9.

If more than one resistor of the series R9 . . . 11 is energized, the base voltage of T3 becomes high so that T3 becomes conducting, with the result that the associated input voltage of W2 becomes low due to the voltage drop across TR9 and the amplification of this signal in the emitter-follower V3. In the opposite case, this input voltage is high. If more than two of the resistors R12–R16 are energized, T4 is conducting so that the collector-electrode voltage becomes low due to the voltage drop across TR12. This signal is amplified by emitter follower V4, and is inverted by inverter VI4. If both input voltages of the AND-gate W2 are high, the edge criterion is satisfied: last column less than two, the remainder more than three occupied character positions. The same is done in the upper half for the upper row with respect to the remainder of the 3×3 matrix. The outputs of the AND-gates W1 and W2 are coupled by the OR-gate X1. A circuit of the kind set forth is also provided for the other two units, but has been omitted for the sake of simplicity. If in at least one of the four units, the edge criterion is satisfied, the central character position is marked: to this end, the output of I21 is connected, via AND-gate W3, to the output of OR-gate X1. If both voltages are high, the mark signal appears on the output of W3.

FIG. 11 shows the skeletonizing store J, the mark store M, and a portion of the second logic unit L. The skeletonizing store again consists of three shift registers of 30 bits with associated regeneration amplifiers, terminating resistors, and two flip-flops, IJ (IVJ, IRJ, IJ1, IJ2), J2 (JV2, JR2, J21, J22) and J3 (JV3, JR3, J31, J32), respectively. The skeletonizing store and the marking store have the first of these three shift registers in common. The mark store comprises two shift registers of 30 bits, M2 and M3, with associated amplifiers MV2, MV3, terminating resistors MR2, MR3 and five flip-flops M11, M12, M21, M22 and M31. The input of M11 is connected to the output of the AND-gate W3 shown in FIG. 10. The output terminals of the stores are numbered 1 . . . 13. Terminal 5 supplies the information of the central character position. The mark arrives on the input of M11, if the central character position has been marked in the marking store. Consequently, the information of M11 relates to that of I21, and the information of M31 to that of J21. FIG. 11 also shows a logic NAND-gate Y20 and a flip-flop FF.

FIG. 12 shows the remainder of the second logic unit L which comprises the logic NAND-gates Y4 . . . Y18, the OR-gate Y19, the resistors R17 . . . 24, the transistor T5 with variable resistors TR13 . . . 15, the emitter-follower V5 and the voltage terminals U2 and U3. The operation will be described using positive logics, a high signal representing a logic "1." The input terminals of the AND-gates Y4–14 are connected to the indicated terminals of the skeletonizing store shown in FIG. 11, a stroke above a digit indicating that the inverted value of this signal is applied. This is possible in that, the inverted signal is present on the output of the flip-flops and the last bit of the shift registers. For the sake of simplicity, these additional terminals, however, are not shown. The voltage of NAND-gate Y6, for example, is low only if the voltage of terminal 2 is low, the voltage on terminal 3 is high and the voltage on terminal 6 is low. If the position associated with terminal 5 is removed, an interruption will certainly occur because, if the character position is marked, it must have at least two neighbors. The same reasoning applies to the gates Y7, Y11 and Y12. The output voltage of Y6 is supplied to Y 15: if the voltage of Y6 is low, the output voltage of Y15 will, consequently, be high. If the voltages on terminals 2, 4, 6, 8 are high, skeletonizing would also cause an interruption, so in that case, the output voltage of Y15 is high, because the output voltage of Y14 is low. If each time one voltage is high of the terminal voltages 1, 4, 7 and of the terminal voltages 3, 6, 9, while the terminal voltages 2 and 8 are low, an interruption would also occur upon removal of the character position associated with terminal 5. The output voltages of Y4 and Y5 are then high, and the voltages on terminals 2 and 8 are low, so that the terminal voltages $\overline{2}$ and $\overline{8}$ are high. The output voltage of Y8 is then low, and that of Y15 is high. A similar reasoning applies to the gates Y9, Y10 and Y13. By taking into consideration that skeletonizing can be effected only if the character position is marked, it appears that interruptions can indeed be avoided by using said circuit, if all possibilities are investigated.

The voltages on the terminals 1–4, 6–9 are applied to the base of transistor T5 via the resistors R17 . . . 24. The resistors, connecting the electrodes of T5 to the voltage sources (earth and terminal U2), are proportioned such that T5 becomes conducting if at least two resistors are energized. The relevant input voltage of NAND-gate Y16 then becomes low, and the output voltage of Y16 becomes high. If less than two of the resistors R17 . . . R24 are energized, the relevant input voltage of Y16 is high and if, furthermore, one of the input signals of Y17, i.e. $\overline{1} \ldots \overline{4}, \overline{6} \ldots \overline{9}$ is low (more than one is impossible as in that case T5 would have been conducting), the second input voltage of Y16 also becomes high so that the output voltage of Y16 is low. However, if none of the signals $\overline{1} \ldots \overline{4}, \overline{6} \ldots \overline{9}$ is low, the output voltage of Y16 is high. In that case, the relevant point is an isolated point without neighbors. This applies only if the voltage on terminal U3 is high. In conjunction with the NAND-gates Y16 and Y17, the associated input terminals etc., the transistor T5 forms that portion of the logic unit L, which counteracts erosion of the ends of the single series of character positions. Consequently, this portion is active only during the previously mentioned second mode: it is only in that case, that a high signal is present on the third input terminal U3 of the NAND-gate Y16. During the first cycles, the voltage on U3 is low and the output voltage of Y16, consequently, is always high, so that the output voltage of Y18 is low and has no effect on the OR-gate Y19. During a cycle of the second mode, the voltage on U3 is high so that none of the ends can be eroded. If the output voltage of the OR-gate Y19 is low, the character position may be removed. To this end, the output of Y19 is connected, via a line not shown, to the reset input of the flip-flop J21 shown in FIGS. 10 and 11.

The logic NAND-gate Y20 shown in FIG. 11 receives the mark signals from the terminals 10, 11, 12, 13, and also signals if the voltages on terminals 3, 6, 7, 8 and 9 are low, i.e. the output voltage of Y20 is low only if the character positions associated with the terminals 1, 2, 4 and 5 are marked and surrounded by five neighboring positions. This is because M31 corresponds to J21, and terminal 12 corresponds to terminal 4 etc. Moreover, for example, the signal on terminal 3 is written in directly before that of terminal 2 etc. Consequently, in that case, we find the situation where a block of 4 marked positions follows (in the horizontal and the vertical direction) an edge of neighboring positions, thus being capable of forming an end of a double series of character positions. If the output voltage of Y20 is low, the foregoing is remedied, in that the flip-flops M21 is reset so that the relevant character position cannot be removed. As this reset signal has to pass the flip-flop FF, this is effected one clock pulse later.

The foregoing described one embodiment of the invention where each position may have eight neighbors. The separation between the various parts of FIG. 8 was not completely maintained in this embodiment. For example, in FIG. 10, the marking store and the skeletonizing store have the shift register IJ and the associated flip-flops etc. in common. This saves both time and money. In the case of a 32×32 character field, only 37 instead of 38 shift registers have to be passed through. A further reduction of this number can be achieved in that, for example, a part of the main store is constructed as a marking and/or skeletonizing store, in which case, the logic unit generating the criteria has to be switched off during the writing-in phase. Further modifications will be obvious to those skilled in the art.

A problem arises, if the character has a width of 32 positions: due to the construction as a shift register, the left-hand and right-hand sides may influence each other. This effect is avoided, by making the character field one position narrower than the number of bits in the shift registers in the main store.

In the case that each position has six neighbors, another edge criterion can be given: a character is marked, if it has more than one, but less than five neighboring character positions: in that case, the application of the second indispensability criterion also becomes superfluous.

FIG. 13 shows a skeleton character "4," in which for each character position it is indicated whether it is an end point, a connection point or a junction, respectively, denoted by a "1," a "2" and a "3," respectively.

In this case, all eight edge points of a matrix of 3×3 positions are considered to be neighbors of the central point.

Consequently, two three-stroke junctions are situated closely together, and four end points exist.

FIG. 14 shows a test character on a matrix where each position has eight neighboring positions, said test character having been skeletonized to a skeleton character having many series of character positions which intersect each other. For each character position, the number of series of character positions leading thereto is indicated.

The number of series which start from a character position can be readily determined. If the character position has eight neighboring positions, it is counted how often a character position is directly followed by a background position. It appears from FIG. 6, that this number may be 0, 1 . . . 4. One difficult case remains, if four character positions constitute a block, as is the case in the frame shown in dotted lines in FIG. 14. This may be considered as a loop of four character positions, the preceding position of which, each time neighbors the next one: this loop has the same symmetry as the regular pattern. In that case, as is indicated, three of the four character positions may be marked as a connection point, and the remaining position as a four-stroke junction. It would also be possible to create two three-stroke junctions and two connection points, but this would make the structure of the character more complicated.

The same method is also possible for the case involving only four neighbors. In this case the ring to be formed by said four neighbors is to be supplemented with the four positions at the corners of a 3×3 matrix. Again, the number of change-overs from a character position to a background position is counted during a cycle about this ring. Even though this corresponds to the counting of the immediate neighbors, the significant points can thus be determined in the same way for two different regular patterns (i.e. with four and with eight neighbors). The case involving four character positions constituting a block, is solved in the same manner as in the case of eight neighbors.

In the case of a block, an advantage of the method set forth is that the counting of said number of times that a character position is directly followed by a background position during the cycle about said ring, never gives too high a number of said series of character positions starting from the examined character positions, so that the information "four-stroke junction" indeed has to be added: this can be very readily effected by applying the information "four-stroke junction" (which can be obtained in two ways) to two inputs of a logic OR-circuit.

FIG. 15 shows a test character on a matrix where each character position has six neighbors. For determining the number of series starting from a character position (in this case a ring has six character positions which are always neighbors) it is again determined how many times in this ring a character position is directly followed by a background position. This is again the same as the counting of the neighboring character position, but also in this case the same method is used as in the case of four and eight neighbors.

In this case, loops of character positions also occur, which now consist each time of three character positions: the symmetry of this loop is the same as that of the pattern. If three character positions occur in a loop, each of them has three or four neighboring character positions. The rule is that of a loop having its top situated at the upper side, the character position at the lower left is changed into a three-stroke junction, and the other two character positions are changed into connection points.

In the case of a loop having its top at the lower side, the character position at the top right is marked as a three-stroke junction, and the other two character positions are marked as connection points. If a character position forms part of two loops, three cases are possible: it can be viewed as a connection point in both cases, it can be viewed once as a three-stroke junction and once as a connection point, and it can be viewed twice as a three-stroke junction. In these cases, it is considered to be a connection point, a three-stroke junction and a four-stroke junction, respectively. The latter case occurs twice in FIG 15. If different choice had been made, a different number of four-stroke junctions would have been obtained.

FIG. **6*d*** furthermore shows a pattern having three neighbors per character position. In this pattern, a ring is formed from these three neighbors, which are each time separated by a void position, which is in principle unoccupied. The ring thus consists of six positions. Again, it is counted how often a character position is directly followed by a void position. This again corresponds exactly to the counting of the neighboring character positions, but the procedure is thus rendered independent of the pattern, which constitutes an advantage.

FIG. 16 shows a portion of a circuit by means of which it is determined whether a character position is an end point, a connection point, or a junction. The regular pattern is that of FIG. **6*b*, where each position has eight neighbors. The circuit is partly analogous to that shown in FIGS. 9 and 10.**

The circuit comprises a main store E, three shift registers for 30 bits, IJ, J2, J3, comprising regeneration amplifiers IVJ, JV2, JV3, respectively, and terminating resistors IRJ, JR2, JR3, respectively. Connected to the outputs of the shift registers are each time two flip-flops in series, IJ1 and IJ2; J21 and J22; and J31 and J32, respectively. Also provided are eight logic AND-gates BA1 . . . BA8, 32 resistors BR 1 . . . BR32, four transistors BT1 . . . BT4, (incorporating the resistors BTR1 . . . BTR8 in their respective emitter leads and collector leads) the voltage terminal BB1, and the information terminals 1, 2 . . . 9, BB1 . . . BB5.

The pattern on which the character is imaged comprises, for example, 32×32 positions, the information of which is supplied from the main store E, one line after the other. Consequently, the information of three adjoining character positions is available on the terminals 1, 2 and 3. Terminal 3 is also connected to the input of the regeneration amplifier JV2, and hence to the shift register J2. Consequently, if the lines with information from E are directly read one after the other, the information of a block of 3×3 positions is present on the terminals 1 . . . 9. The circuit is designed to consider all eight neighbors of equal weight for each character position, so as to determine how many series of character positions lead to the point under consideration. To this end, the terminals 1 . . . 4, 6 . . . 9 are always connected to two of the AND-gates BA1 . . . BA8. The AND-gate BA3 receives, for example, the information present on terminal 9 in a non-inverted form, and the information present on terminal 6 in an inverted form. Moreover, the information of terminal 5 is also applied to said AND-gate. Therefore, the output signal of BA3 is high, only if the signals of terminals 5 and 9 are high, and the signal of terminal 6 is low, i.e. if a change-over occurs from character position, to background position when the terminals 1 . . . 4, 6 . . . 9 are passed in a clockwise manner. The output signals of the AND-gates are added by means of the resistors BR1 . . . B32, and are applied to the base electrodes of the transistors BT1 . . . BT4. These transistors are each time connected, via two of the resistors BTR1 . . . 8, to the terminal BB1, (to which a supply voltage is applied) and to earth. The resistors BTR1 . . . 8 are each time chosen such that BT1 becomes conducting, if at least two of the AND-gates BA1 . . . 8 supply a high signal. BT2 becomes conducting if at least three of these gates supply a high signal, etc. It appears that under normal circumstances, BT4 will never become conducting: five-stroke junctions do not occur. The output signals of the transistors BT1 . . . 4 are applied to the output signal terminals BB2 . . . 5.

FIG. 17 shows another portion of the circuit arrangement. The following code is chosen by way of example:

| | |
|---|---|
| void point | 000 |
| end point | 100 |
| connection point | 111 |
| three-stroke junction | 010 |
| four-stroke junction | 110 |

The code has been chosen rather at random, but the third bit "1" occurs only in the case of connection points. The circuit arrangement comprises five input signal terminals 5 and BB2 . . . 5, five output signal terminals BB6 . . . 10, seven logic AND-gates BA9 . . . 15, two logic OR-gates BO1, and BO2, one regeneration amplifier BV, three flip-flops BF1 . . . 3, and one shift register BF with matching resistors BFR.

The input signal terminals 5 and BB2 . . . 5 are identical to, or are connected to, the output terminals 5 and BB2 . . . 5 shown in FIG. 16. The signal on terminal 5 is high, if the associated position is a character position. AND-gate BA9 receives this information in an inverted form, so the signal on output terminal BB6 is high, if terminal 5 relates to a background position. If only one of the AND-gates BA1 . . . 8 shown in FIG. 16 supplies a high signal, none of the transistors BT 1 . . . 4 is conducting, and all the signals of the terminal 5 and BB2 . . . 5 are high. As one of these signals is always applied to the AND-gates BA9 . . . 14 in an inverted form, the output signal of all gates is low, except that of BA10 which makes the signal of output terminal BB7 high via the OR-gate BO1. The code "100" is thus determined, because both other code bits can appear on the outputs of the OR-gate BO2, and the AND-gate BA13, respectively.

If the signal of two of the gates BA1 . . . 8 is high, the signal of terminal BB2 is low, and the signals of BB3 . . . 5 high. Consequently, only the three input signals of AND-gate BA11 are high, (the signal of BB2 is applied to BA11 in an inverted form) so that the OR-gates BO1 and BO2 receive a high signal, and the signals on the output terminals BB7 and BB8 are high: the code "111" is generated, which applies to a connection point because the input signal of the regeneration amplifier BV is then also high. In the case that a connection point forms part of a block of four character positions, which are provisionally viewed as a connection point, this has been incorrectly done because a four-stroke junction is present. Consequently, the input signal of the regeneration amplifier BV, representing the third bit of the code, is applied to a quadrangle detector which is formed by the AND-gate BA15. Always the third bits of successive character positions are shifted, under the control of clock pulses not shown, through a shift register consisting of three flip-flops BF1, BF2 and BF3, and the shift register BF. The latter has 31 bits, while the character may be imaged on a 32×32 matrix. Consequently, exactly one complete line of the matrix is present in BF and BF3 combined. If all of the output signals of the flip-flops BF1, 2 and 3, and those of the shift register BF are high, a block of this kind is present. This is detected by the AND-gate BA15, and the output signal of BA15 resets flip-flop BF1, the information contained therein then forming a "110" code.

If two of the transistors BT1 . . . 4 are conducting, the character position under consideration is a three-stroke junction, and AND-gate BA 12 supplies a high signal, with the result that terminal BB8 supplies a high signal: the code 010 is then formed.

If the transistors BT1 . . . 3 are conducting, the signals of terminals BB2 . . . BB4 are low, and the signal of BB5 is high. The code "110" is then formed by high signals on the terminals BB7 and BB8.

If the transistor BT4 is also conducting, more than four change-overs from a character position to a background position are found upon a cycle about the positions neighboring those character positions. This is not possible: in that case, the signal of output terminal BB10 of the AND-gate BA14 becomes high, which is an error signal. In that case, for example, the cycle about the character may be repeated.

The foregoing is one possible embodiment; other embodiments will be obvious to those skilled in the art, including the case of six neighboring positions where two triangle detectors are present. The outputs thereof, are connected in an additional logic unit which detects whether two character positions to be marked as a three-stroke junction coincide. It is also possible to combine three-stroke or four-stroke junctions into four or more stroke junctions, if they are situated near enough together. This may be useful, as skeletonizing often changes two intersecting stroke elements in two closely adjoining three-stroke junctions (compare FIG. 13). Combinations to form five-stroke and six-stroke junctions are also possible.

FIG. 18 shows a skeleton character "7," the character positions of which are denoted by letters A, and the remaining positions being denoted by dots. The character has a plurality of tails. These tails make recognition by man hardly more difficult, but a machine considers all these branches as essential characteristics. Consequently, it is advantageous to remove these tails. On the other hand, not too much is to be removed: for example, the characteristic horizontal short stroke through the center of the vertical stroke which is characteristic to a "7." In practice, it appears to be advantageous to remove the tails whose length is less than approximately one-tenth of the dimensions of the character.

The method according to the invention may be realized, for example, in a device whose block diagram is shown in FIG. 19. The device comprises a main store C1, a control unit C2, a treatment unit C3, comprising a detector C4 and a cycle generator C5. A simple embodiment is that a search series of said first kind is started by the cycle generator C5. Therein, the information of the positions stored in the main store C1 are successively addressed. This is possible, for example, in that the control unit C2 supplies clock pulses to the main store C1, which is constructed as a shift register. The detector C4 is set for detecting end points by a signal from the cycle generator C5. When an end point is detected, C5 receives an equality signal, so that it controls a search series of said second kind. Meanwhile, the information of the end point is isolated, for example, in that the information of the character position is changed into that of a background position, and is at the same time stored in an isolation store, which forms part of the treatment device C3, from where it can be addressed when necessary.

During a search series of said second kind, the detector C4 can detect connection points and junctions following a relevant signal from C5. In this search series, the neighboring positions are interrogated of the character position whose information was isolated in the previous search series. If a junction is detected, the detector supplies an equality signal, which is interpreted by C5 as a first stop signal: this means that a sufficiently short tail has been found, extending from this junction to the last previously found end point. The neighbors of a connection point may include junctions as well as connection points; however, there may not be more than one connection point, if there is not at least one junction. It is obvious that character positions whose information had already been isolated, are not taken into account in this respect. After the said first stop signal, the search series of said first kind is resumed without the previously isolated information still being available. In this way, for example, all projecting stroke elements of at the most two character positions, can be removed.

If no junctions are found during successive search series of said second kind, the series of character positions constitutes a real element of the investigated character. Therefore, the cycle generator C5 may comprise, for example, a counter which counts the said equality signals. When a given position is reached, for example 3, this counter supplies a second stop signal. After that, the information of the character positions isolated since the preceding stop signal, is restored by the treatment device C3.

Another method of defining the span length in combination with a device as shown in FIG. 19, is shown in FIG. 25. The device comprises a two-dimensional shift register having 9 flip-flops CO1 . . . 9, 12 interconnection units CP1 . . . 12, and an OR-gate CQ.

This method applies to a pattern where each position has four neighbors, but it can be readily modified. In this case, all projecting stroke elements are removed whose ends are situated within a matrix of 3×3 positions with respect to the junction in the center of this matrix. After detection of an end point, the information thereof, is stored in the flip-flop CO1 via the input terminal thereof. If a connection point is found upon a cycle about the neighboring positions, a shift pulse is applied to the shift register on the basis of the location thereof. If the connection point was situated at the right of the end point, the information of the end point is also shifted to the right i.e. to flip-flop CO6), while the information of the connection point is stored in CO1. This is possible in that the shift register receives a clock pulse and, in addition, the interconnection units CP2, CP7 and CP12 are activated. If subsequently another connection point is found, but now above the last connection point found, all information is shifted upwards one location, by a clock pulse and the activation of the interconnection units CP8, 9 and 10. The flip-flops CO1, CO8 and CO7 are then in the "1" state, and the others are in the rest state. If yet another connection point is found, for example, again above the last connection point found, the information is again shifted upwards on location, which means that in this case, two input signals of the OR-gate CQ become high: this produces a high output signal of this gate; this is the second stop signal, which means that this projecting stroke element is too long, as the span length extends outside the 3×3 matrix. The information of the relevant character positions is then restored, for example, in that this information appears on the outputs of the flip-flops, and is taken over in order to reappear in the main store in the correct location. This is possible, for example, in that the information stored in the device of FIG. 25 can be transferred in a parallel form to corresponding locations in the main store.

Another embodiment according to the invention is illustrated in FIG. 23, which refers to the case of a rectangular matrix having eight neighbors per position. The information is stored as two bits, i.e. "00" is a background position, "01" is an end point, i.e. a character position having one neighbor forming part of the skeleton character, "10" is a connection point, i.e. a character position having two neighbors, and "11" is a character position having three or more neighbors.

The character is scanned, for example, in that the information of the positions is successively applied to a detector. Shortening can be effected by starting from a branching point detected in the detector. If desired, a start can also be made from a position having three or more neighboring character positions, which makes no difference to the further description. If a branching point (i.e. the information "11") is found, the position is placed in the center of a matrix according to the diagram shown in FIG. 20. The positions are than interrogated in the indicated sequence until the information "01" appears, i.e. an end point is met. If such an end point is found, it is removed, its position being placed in the center of the matrix of FIG. 20. Subsequently, the positions are interrogated in the sequence indicated there. Each time that a connection point is found, it is removed and the position thereof is placed in the center of the matrix. After that, a new search series (of the second kind) is started. It may be that the position in the center has two connection points as neighbors during a search series of the second kind, but then the position in the center also has a junction as a neighbor and, consequently, the above-mentioned first stop signal is produced again.

If all redundant information also has to be removed near the junction, the information may be tested against an indispensability criterion, for example, against the previously mentioned indispensability criterion: removal of a character position may not cause an interruption in the skeleton character. After that, the search series of the first kind is continued.

When all positions of the 7×7 matrix have been interrogated in the search for an end point, the positions of the area in which the character is situated are further interrogated in the search for a junction.

FIG. 21 shows the sequence in which the positions are interrogated in a search for an end point for a pattern where each position has six neighbors. The span length is determined by the dimension of the FIGS. 20 and 21: the area investigated during a search series of a first kind is limited. The short stroke elements almost always start from the nearest junction.

FIG. 23 shows the diagram of an interrogation unit, said diagram comprising two stores CA and CA2, two read units CH and CH2, two counters CI and CI2, two output stages CB and CB2, one processing store CC, comprising the bistable elements CC1 . . . *n*, *k* detectors CD1 . . . *k*, a ring counter consisting of *k* bistable elements CE1 . . . *k*, a detector CJ, a kind-selector CM, a clock CK, a control unit CL, and the signal terminals CG1 . . . 10. The information of all positions is stored in the store CA. If the character comprises, for example, 32×32 positions, the capacity of this store must be 2,048 bits. Under the control of a signal of the read unit CH, for example, each time one word can be read. The choice which word is read is controlled by the counter CI, having a forward counting, and a backward counting, input terminal, CG6 and CG7, respectively. A word is read under the control of a signal on terminal CG5. For the sake of simplicity, it is assumed that a word comprises 64 bits. If less bits are involved, for example, 32, always two words have to be read in succession per line of the character field, but this does not give an essentially different solution. The information from the store is applied, via the output stage CB, comprising, for example, a number of amplifiers, to a processing store CC, comprising the units CC1 . . . CCn, the value of *n* being, for example, 64. The outputs of each two elements of this register lead to a detector, for example, those of CC1 and CC2 lead to the detector CD1 of the detectors CD1 . . . CD*k*, *k* being one-half/*n*, so, for example, 32. The elements CC1 . . . can supply a signal indicating the information as well as the inverted signal, so that said connections always comprise two lines between CC1 and CD1, etc.

Also provided is a ring counter consisting of *k* (for example, 32) bistable elements CE1 . . . CE*k*, one of which is always in the first position, the remaining (*k*—1) being in the second position.

Only one detector is activated by the output signals of this ring counter. The ring counter also comprises two input terminals CG3, and CG4 which act as a set and a reset input.

The kind-selection input terminal CG2 is of a triple construction, and determines in reaction to which kind of character positions the detectors can supply, an output signal to the output terminal CG1. At the beginning of the scan of the positions of the character field, the ring counter CE1 . . . CE*k* is in the first position, and the kind-selector CM is set for the information "11." The counter CI is in the first position, and in reaction to a pulse on terminal CG5, the first word is read which comprises, for example, the information of the upper row of positions of the character field. In reaction to clock pulses of the clock CK on the terminal CG3, the ring counter always counts one unit further. When the element CE*k* changes from the first to the second position, the information of said upper row of positions has been interrogated, and a signal is applied from the detector CJ to the forward counting input of the counter CI, and to terminal CG5 of the read unit CH. Consequently, the next word is read, and the positions of the character field are successively interrogated. If no junctions are detected, the last word is finally read, at the end of which the counter CI applies a signal, for example, to terminal CG9, so that it is signalled that the treatment of the character has been completed, and no further redundant short stroke elements are present.

When a junction is found, one of the detectors CD1 . . . CD*k* supplies an equality signal. This signal is applied to the clock which consequently, supplies no further signals to the terminal CG3, and to the control unit CL. The latter applies a pulse to the kind-selector CM, so that the latter applies the signal "01" to the detectors CD1 . . . etc, which then start to detect end points. Next, CL applies a signal to a counter CI2 of a second store CA2, and to the read unit CH2 thereof. In the store CA2, the words consisting of eight bits, shown in FIG. 22, are stored. In reaction to the first pulse, the first word is read. The first bit thereof relates to the direction to be followed by the counter CI, and the next three bits relate to the number of steps to be performed; the same applies to the last four bits with respect to the ring counter CE1 . . . *k*. The first word thus supplies the line counter with the command: one line down; and the ring counter with the command: stay. In this way, the position is interrogated which is situated directly below the position where a junction was detected, and further all positions 2. . . . 48 of FIG. 20. In this way, first the nearest end point is always systematically searched. If no end point is found among these 48 positions, the counter CI2 finally supplies a signal: as a result, the kind selector is set for the detection of junctions, and the character field is further interrogated.

If an end point is found, an equality signal is supplied. This equality signal sets the kind-selector to the position "connection point," and subsequently the first eight words from the store CA2 are successively addressed. If an equality signal is then supplied by a detector, the counter CI2 receives a pulse so that it again starts the addressing of the information stored in CA2. If an end point, or a connection point is found, the information thereof is isolated. This is possible in that the information of the positions of the counter CI and the ring counter, is stored in a third store not shown. When the entire character field has been interrogated, the relevant character positions are changed into background positions.

When a connection point is found, the said first stop signal is generated. The information isolated since the previous stop signal, then relates to character positions which may be removed. The counter CI and the ring counter then return to the position of the last junction found, which is almost always the junction just found. Different procedures can be followed. For example, it is possible to remove all short projecting stroke elements. However, it is also possible to remove only the shortest stroke in the case of a three-stroke junction, and to leave the longer strokes: this is because the three-stroke junction B is no longer a three-stroke junction.

FIG. 24 shows a diagram of a detector comprising three logic NAND-gates CF10, CF01 and CF11, nine signal terminals CF1 . . . 8 and CF14, a stop signal generator CF12, a logic NAND-gate CF12, and an inverter CF13.

The information of the position to be interrogated arrives on the terminals CF1 . . . 4, the information "00," "01," "10" and "11" denoting background positions, end points, connection points and junctions, respectively. The information of the first of the two bits appears on the terminals CF1 and CF4. If this is a "1," the signal on terminal CF1 is high and the signal on terminal CF4 is low. If this is a "0," the signal on CF1 is low, and the signal on CF4 is high. The second bit arrives on the terminals CF2 and CF3. If this is a "1," the signal on terminal CF2 is high, and the signal on terminal CF3 is low, and vice versa.

The kind-selector CM shown in FIG. 23, can produce a high signal on one or more of the terminals CF6, 7 or 8: the relevant kind is then selected. So, first only CF8 is high during the search for a junction. CF5 then receives a signal from the ring counter. If the signal on CF5 is low, the output signal of CF9 is high, independent of the information of the interrogated position. If the signal on CF5 is high and a position of the searched kind is interrogated, the output of the associated NAND-gate, in this case CF11, is low, and this signal is inverted by the inverter CF13, so that the input signal of CF9 becomes high, and the output signal of CF9 becomes low. This is the equality signal. The same takes place during the search for end points and connection points. If the search is made for a connection point, the search series of the second kind is to be stopped by the detection of a stop signal. This is effected in that the stop signal generator CF12, receiving the output signal of CF11, applies this signal to CF14 in an inverted form. If the signal on CF is high, a high signal appears on the output of CF14. During the search for a junction (in order to find an end point nearby) the output signal of CF14 is blocked by a unit not shown. During a search series of the second kind, consequently, all (in this case eight) neighboring positions are interrogated, before a new search series of the second kind can be started.

According to the invention, various combinations of methods can be used. The span length can be defined in different manners; a search can first be made for end points or first for junctions; the number of neighbors may deviate from eight, and they need not all have the same rank or weight; all short stroke elements can be removed, or each time only the shortest stroke element starting from a junction. In this way, there are many possibilities which all incorporate the advantages of the invention.

In all instances, many of the previously mentioned methods can be combined: only a number of combinations has been given by way of example, it being readily possible to extend said number.

As regards skeletonizing, it is to be noted that the testing against an indispensability criterion is effected in a changing character, which means that the result of the test for a character position tested at a later stage depends on the removal of non-removal of a previously tested character position. Due to this method, it is achieved that only a comparatively small number of skeletonizing cycles is required, which offers a large saving in time: this means that a severe edge criterion may be drafted which is satisfied by many character positions.

What is claimed is:

1. A method of preparing characters which are imaged on a two-dimensional regular pattern of positions, a character position being distinguished from a background position by digital information present, the characters being skeletonized for removal of redundant information in that the information of a character position is changed into that of a background position until a skeleton character is obtained whose stroke elements consist of single series of character positions which succeed each other in accordance with an adjacency criterion, said skeletonizing being performed in cycles, in which the positions of the character field are considered according to a regular and fixed sequence, said method comprising the steps of:

A. dividing said cycles into at least one cycle of a first mode, followed by at least one cycle of a second mode;

B. marking in accordance with an edge criterion, first mode character positions that are situated at an edge of the character, by associating additional information with information of these character positions;

C. deciding whether to remove or retain the marked character positions on the basis of an indispensability criterion;

D. testing character positions during a cycle of said second mode against an indispensability criterion, and removing or retaining them on the basis of said test;

E. counting how many of said series start from all character positions of said skeleton characters in order to determine end points, connection points, and junctions in said skeleton characters, said additional information being associated with the information of said character positions;

F. removing at least one series of the series of character positions starting from a junction dependent upon whether a span length of that series, measured as a number of positions from an end point of said series to said junction, does not exceed a given value; and G. changing said additional information of the junction as originally existed prior to its removal, if said removal causes said junction to change over into a connection point.

2. The method as claimed in claim 1, wherein during cycles of said first mode an indispensability criterion applies which comprises at least one first sub-criterion which prevents any removal which would cause an interruption and which comprises, during cycles of said second mode, a second sub-criterion, in addition to the said first criterion, which prevents removal of a character position tested against said indispensability criterion, if this character position has only one neighboring character position, which signifies that the tested character position constitutes an end of a character, which end might be unduly eroded by removal of said tested character position, said indispensability criterion comprising a third sub-criterion, during at least one cycle of at least one of said two modes, which determines whether a character position tested against said indispensability criterion forms part of a number of neighboring character positions to be tested against said indispensability criterion, said neighboring positions forming a block, it being possible for said block to be further limited by a number of background positions so that said block can constitute an end of a character which might be unduly eroded by removal without said first and second sub-criterion taking effect, said third sub-criterion changing said additional information of at least one of the character positions to be tested which forms part of said block, so that this character position is not tested against said indispensability criterion.

3. The method as claimed in claim 1, wherein said span length is measured according to a shortest possible connection which can apply according to said adjacency criterion.

4. The method of claim 1, wherein each position has a number of neighboring positions that form, possibly in conjunction with a number of other positions which can include void positions, a ring about a position, said method further comprising the steps of:

H. counting the number of times a character position is directly followed by another position from which the number of series of character positions starting from that character position can be determined, said counting being accomplished during a cycle about the positions of said ring about a character position;

I. marking all but one character position of a possible loop as connection points, said loop being a series of character positions succeeding each other in accordance with said adjacency criterion, said loop series habing a smallest possible length in said regular pattern and the same symmetry as said regular pattern, said loop series length being shorter than said ring; and J. marking remaining character positions as a junction, from which as many of the series start as said loop has character positions.

5. The method of claim 4, comprising the additional step of:

K. joining at least two junctions situated within a given maximum distance from each other, said distance possibly being zero, wherein the total number of series exceeding two per junction is associated with a character position as an additional mark, said additional mark being marked at least as a four stroke junction.

6. A device for skeletonizing characters imaged on a carrier, according to a two-dimensional regular pattern of positions, said device comprising:

a detector and storage means associated therewith, said detector feeding information of the characters into said storage means so that the characters are stored as digital information of character positions and background positions, respectively;

skeletonizing means for receiving and changing information of character positions into those of background positions until the information of character positions have been reduced to information of character positions of skeleton characters whose stroke elements consit of a single series of character positions which succeed each other in accordance with an adjacency criterion, said skeletonizing means comprising a control unit associated with said storage means for controlling skeletonizing of said characters in cycles, said control unit operative in two modes, a first mode having at least one cycle and a second mode having at least one cycle;

a first deciding unit connected to said control unit for receiving during a cycle of the first mode, at least the information of the character positions together with information of positions neighboring those character positions, said first deciding unit incorporating an edge criterion and associating additional information with the information of the character positions to compare whether said character positions satisfy said edge criterion;

a second deciding unit connected to said first deciding unit for receiving the information of the character positions and those positions neighboring said character positions during said first mode, said second deciding unit incorporating a logic indispensability criterion and comparing the information of said character positions satisfying said edge criterion with said logic indispensability criterion, said second deciding unit receiving during a cycle of said second mode, information of remaining character positions, and comparing the remaining character positions with the logic indispensability criterion irregardless of whether said remaining positions satisfy said edge criterion; and a counter which compares positions of a ring of positions about a character position, said positions including void as well as neighboring positions about a central position, said counter counting how often a character position is directly followed by a background position or a void position during a cycle about said ring, said counter generating a signal corresponding to this count;

a detector connected to said counter for detecting end points, connection points, and junctions, respectively, during a series of searches, and supplying an equality signal when a proper point is located, said control limit responsive to said equality signal and which interrogates information of a number of positions, said number possibly being zero, during at least one search series; and an isolation store connected to said detector and said control unit for isolating information of an end point during a search series of a first type, and isolating information of a connection point during a search series of a second type, said second type of search starting in response to receipt of an equality signal by said control unit during said first type of search series, said isolation store further comprising a span length defining unit having a capacity measured in a number of character positions, said defining unit supplying a signal when a span length of a series of character positions reaches a given value, said span length signal being supplied to said control unit in order to prevent the start of a next search series of the second type.

7. A device as claimed in claim 6, wherein the information of the positions being applied to the deciding units is applied in a fixed sequence, said second deciding unit comprising a first and a second circuit for a first and a second indispensability sub-criterion, respectively, it being possible to activate said circuits by said control unit, said control unit activating only the first circuit during cycles of said first mode, but activating both circuits during cycles of said second mode, said first circuit supplying a signal if removal of a character position would cause an interruption, said second circuit counting the number of character positions neighboring said character positions, and supplying a signal if this number amounts to one, signifying that the character position constitutes an end of a character which might be unduly eroded by removal of said said character position, the second deciding unit being capable of preventing the removal of the relevant character position under the control of at least one of said signals, said deciding unit comprising a third circuit for a third indispensability sub-criterion, which compares the information of character positions with the information of at least three character positions neighboring these character positions, said third circuit supplying a signal if these character positions, forming a block, are all provided with said addition information, and may furthermore have a number of background positions as neighboring positions so that said marked block can constitute an end of a character which might be unduly eroded by removal of said character positions without the sub-criteria generated by said first and said second circuits having the possibility of becoming effective, it being possible to change the additional information of at least one of said marked character positions by said signal of said third circuit such that this character position is not tested against said indispensability criterion.

8. A device as claimed in claim 7 wherein said span length defining unit defines an area consisting of a number of positions around a central position, the number of positions in a series which starts in said central position, and which terminates at a position constituting a limit of said series, always being at least equal to said span length.

9. A device as claimed in claim 7 wherein said span length defining unit comprises a counter which counts the number of character positions from which information is isolated, said counter supplying a signal, when a given position corresponding to a span length is reached, to a control unit in order to prevent a next search series of said second type.

10. A device as claimed in claim 9, wherein a loop detector is provided which is connected to said storage means and which receives the information of all character positions forming part of a loop, said loop consisting of a series of character positions which succeed each other in accordance with said adjacency criterion, said series having the smallest possible length in said regular pattern, and thus the same symmetry as said regular pattern, and furthermore being shorter than said ring, the loop detector generating a junction output signal when a loop is detected so that the stored information of one of the character positions of said loop is changed into that of a junction from which as many of said series of character positions start as said loop has character positions, the other character positions of that loop being changed into connection points.

11. A device as claimed in claim 10 wherein a coincidence detector is provided which detects whether at least two junctions are situated with a given maximum distance, it being possible for said distance to be zero, and which supplies a signal when these junctions are found; a joining unit connected to said coincidence detector and said storage means which receives the coincidence detector signal and which also receives the stored information of those junctions, said joining unit associates additional information with the information of one character position, which is then at least marked as a four-stroke junction, and which changes other junctions detected by the coincidence detector into connection points.

* * * * *